US007850433B2

(12) United States Patent
Tormaschy et al.

(10) Patent No.: US 7,850,433 B2
(45) Date of Patent: Dec. 14, 2010

(54) WATER CIRCULATION SYSTEMS FOR PONDS, LAKES, AND OTHER BODIES OF WATER

(75) Inventors: Willard R. Tormaschy, Dickinson, ND (US); Gary A. Kudrna, Dickinson, ND (US); Tait J. Obritsch, Fairfield, ND (US); Joel J. Bleth, Dickinson, ND (US)

(73) Assignee: Medora Environmental, Inc., Dickinson, ND (US)

( * ) Notice: Subject to any disclaimer, the term of this patent is extended or adjusted under 35 U.S.C. 154(b) by 0 days.

(21) Appl. No.: 11/946,716

(22) Filed: Nov. 28, 2007

(65) Prior Publication Data

US 2008/0169229 A1    Jul. 17, 2008

Related U.S. Application Data

(62) Division of application No. 11/848,425, filed on Aug. 31, 2007, which is a division of application No. 10/749,064, filed on Dec. 30, 2003, now Pat. No. 7,285,208.

(60) Provisional application No. 60/437,217, filed on Dec. 31, 2002.

(51) Int. Cl.
  F04B 53/00    (2006.01)
  F01D 25/28    (2006.01)
(52) U.S. Cl. .......................... 417/61; 415/7
(58) Field of Classification Search ............ 417/61; 210/242.2, 169, 695, 170.05; 415/7; 261/91, 261/120; 416/171; 138/30, 31, 45, 46
See application file for complete search history.

(56) References Cited

U.S. PATENT DOCUMENTS

| 1,530,326 | A |   | 3/1925  | Prindle |
| 2,827,268 | A |   | 3/1958  | Staaf |
| 3,204,768 | A |   | 9/1965  | Daniel |
| 3,416,729 | A | * | 12/1968 | Ravitts et al. ................. 239/16 |
| 3,512,375 | A |   | 5/1970  | Madarasz et al. |
| 3,521,864 | A | * | 7/1970  | Welles, Jr. .................... 261/77 |
| 3,524,629 | A | * | 8/1970  | Culwell ...................... 366/263 |
| 3,572,658 | A | * | 3/1971  | Ravitts ...................... 261/36.1 |
| 3,603,804 | A | * | 9/1971  | Casey ......................... 290/42 |
| 3,669,422 | A | * | 6/1972  | Nogaj ........................ 261/34.1 |
| 3,735,926 | A | * | 5/1973  | Ravitts ....................... 239/16 |
| 3,794,303 | A |   | 2/1974  | Hirshon |
| 3,797,809 | A | * | 3/1974  | Sydnor, Jr. .................. 261/91 |

(Continued)

FOREIGN PATENT DOCUMENTS

CA    1 262 052    10/1989

(Continued)

Primary Examiner—C. Freay
Assistant Examiner—Alexander B Comley
(74) Attorney, Agent, or Firm—W. Scott Carson

(57) ABSTRACT

Circulation systems for ponds, lakes, or other bodies of water. In one set of embodiments, water is drawn up from the depths of the body for exposure to the atmosphere and to generate an overall, high flow circulation pattern throughout the entire body. In other embodiments, the circulation in the body of water is primarily limited to an upper aerobic zone with only small and controlled volumes from a lower anaerobic zone being brought up. Each system preferably includes a flotation platform, dish, impeller, and draft tube with specific modifications to the various systems to adapt them for use in a variety of environments.

6 Claims, 17 Drawing Sheets

U.S. PATENT DOCUMENTS

| | | | |
|---|---|---|---|
| 3,837,309 A | 9/1974 | Biewer | |
| 3,856,272 A | 12/1974 | Ravitts | |
| 3,871,581 A * | 3/1975 | Dively | 239/16 |
| 3,907,979 A | 9/1975 | Jenniges | |
| 3,928,512 A * | 12/1975 | Cherry | 261/91 |
| 4,003,796 A * | 1/1977 | Muller et al. | 435/295.1 |
| 4,030,859 A | 6/1977 | Henegar | |
| 4,089,620 A * | 5/1978 | Ravitts | 417/61 |
| 4,133,850 A * | 1/1979 | Hauser | 261/93 |
| 4,140,737 A * | 2/1979 | Hauser | 261/93 |
| 4,179,243 A | 12/1979 | Aide | |
| 4,335,576 A * | 6/1982 | Hopfe | 60/398 |
| 4,358,413 A * | 11/1982 | Brucker | 261/36.1 |
| 4,446,378 A * | 5/1984 | Parra | 290/54 |
| 4,497,342 A | 2/1985 | Wenzel et al. | |
| 4,540,528 A * | 9/1985 | Haegeman | 261/91 |
| 4,734,235 A * | 3/1988 | Holyoak | 261/91 |
| 4,764,313 A | 8/1988 | Cameron et al. | |
| 5,011,372 A * | 4/1991 | Nigrelli et al. | 415/211.2 |
| 5,021,154 A | 6/1991 | Haegeman | |
| 5,122,266 A | 6/1992 | Kent | |
| 5,275,762 A * | 1/1994 | Burgess | 261/4 |
| 5,505,541 A * | 4/1996 | Kihara | 366/264 |
| 5,851,066 A * | 12/1998 | Nocifora et al. | 366/270 |
| 5,980,100 A * | 11/1999 | Haegeman | 366/262 |
| 6,050,550 A * | 4/2000 | Burgess | 261/29 |
| 6,273,402 B1 | 8/2001 | Cheng | |
| 6,276,670 B1 * | 8/2001 | Jacobs | 261/91 |
| 6,432,302 B1 | 8/2002 | Obritsch | |
| 6,439,853 B2 | 8/2002 | Tormaschy | |
| 6,533,496 B1 * | 3/2003 | Elliott | 405/80 |
| 2004/0079689 A1 * | 4/2004 | Newman | 210/136 |
| 2006/0245997 A1 | 11/2006 | Daum et al. | |

FOREIGN PATENT DOCUMENTS

| | | |
|---|---|---|
| EP | 0218411 B1 | 11/1989 |
| JP | 11047794 | 2/1999 |

\* cited by examiner

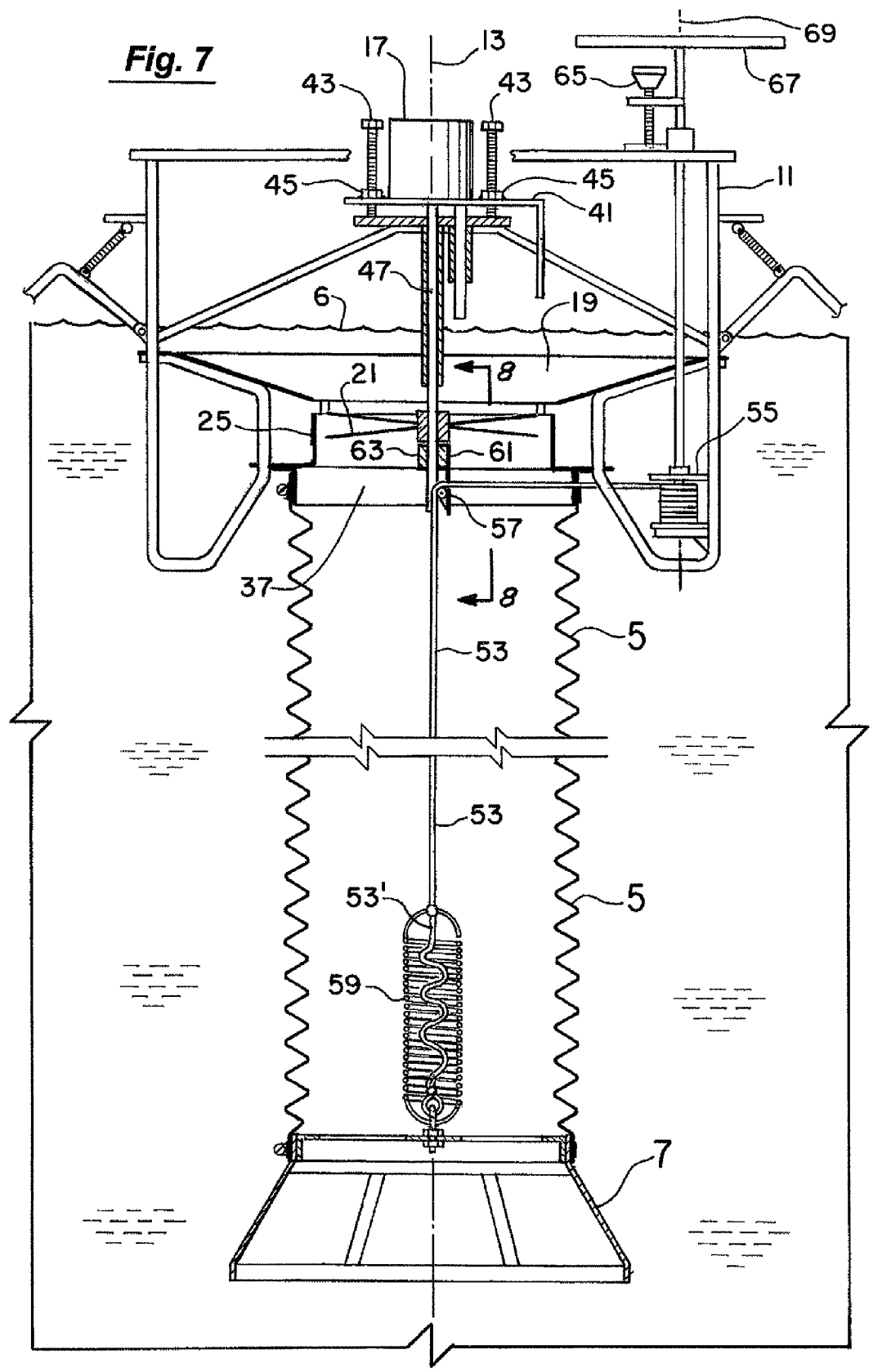

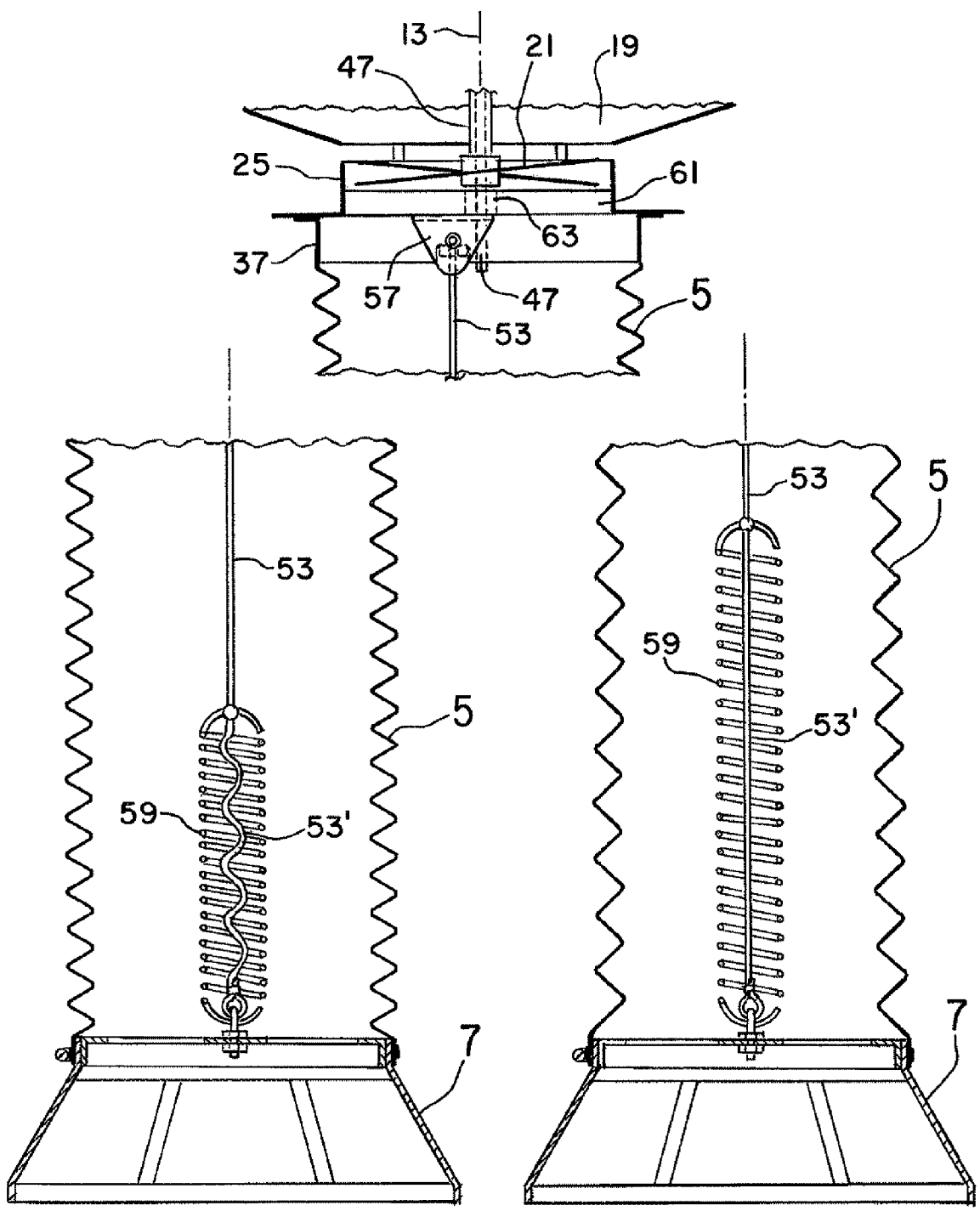

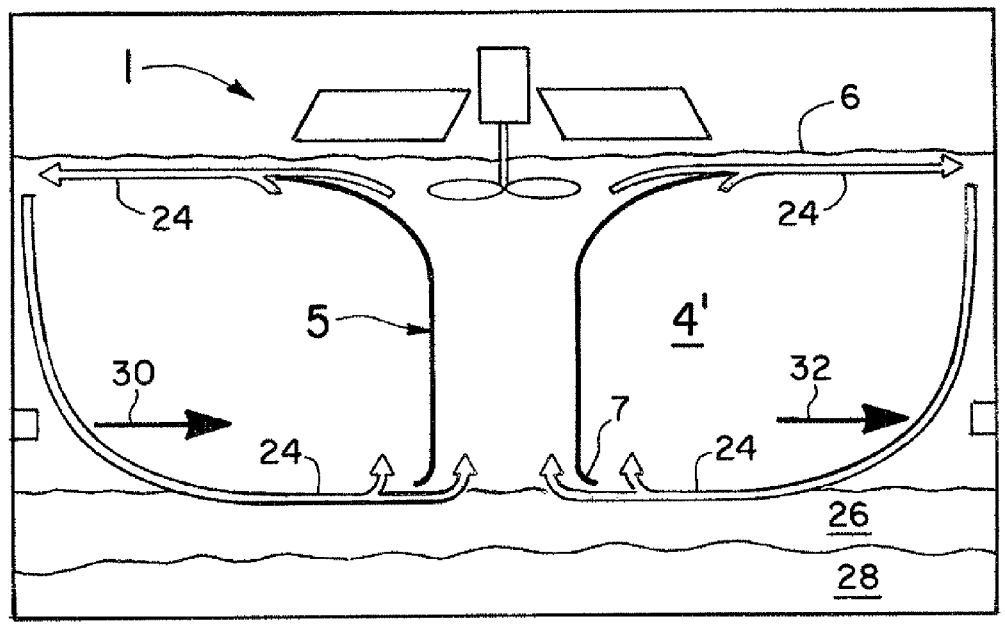
*Fig. 13*
*Fig. 14*
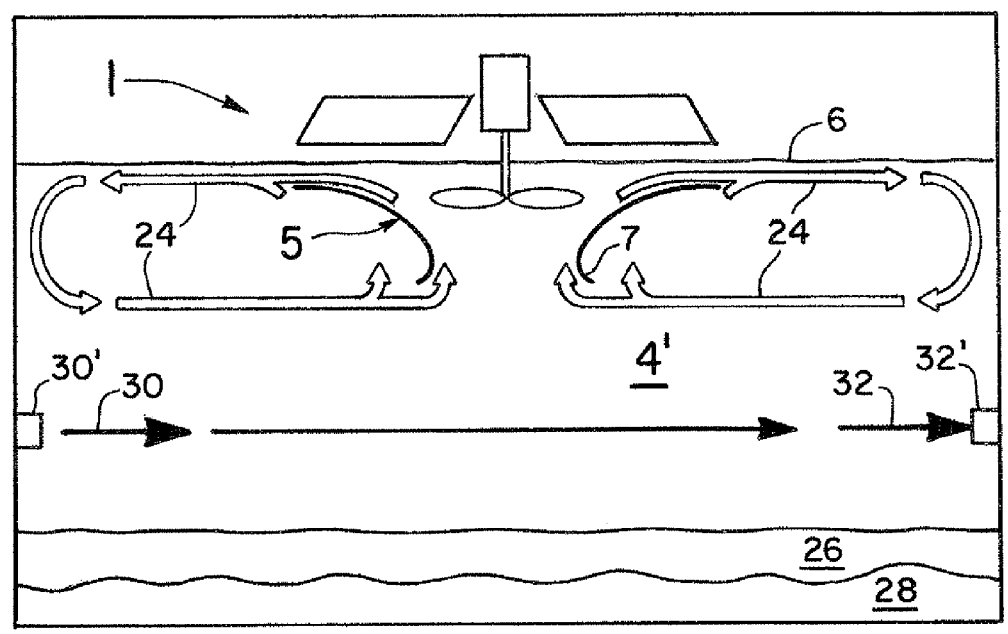

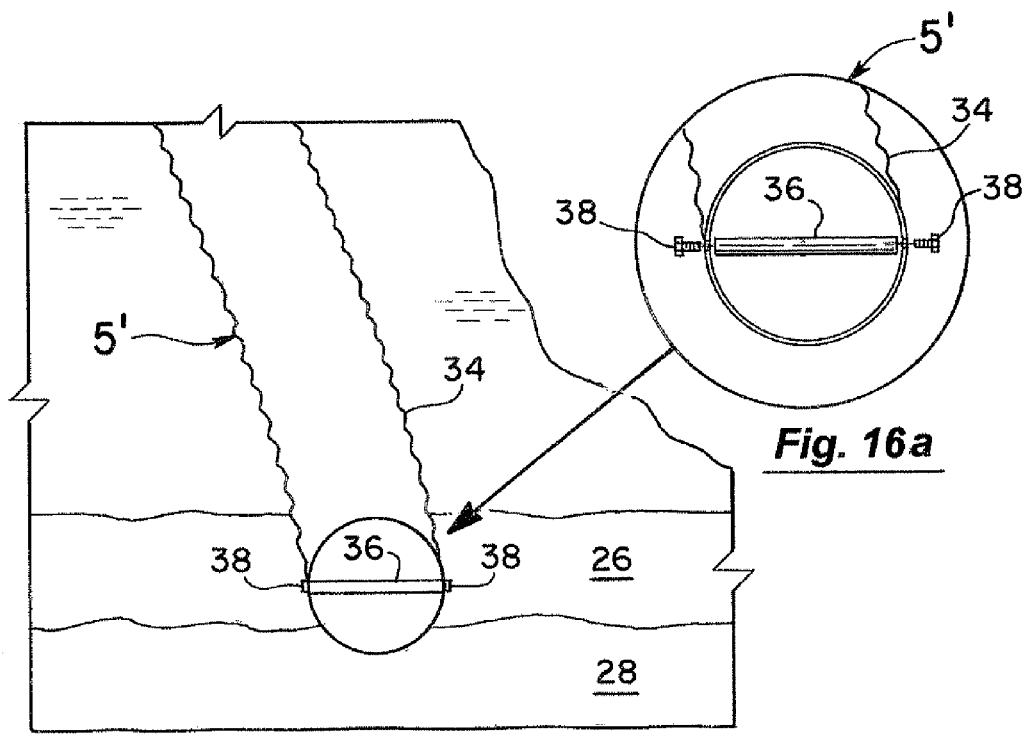
*Fig. 16a*
*Fig. 16*
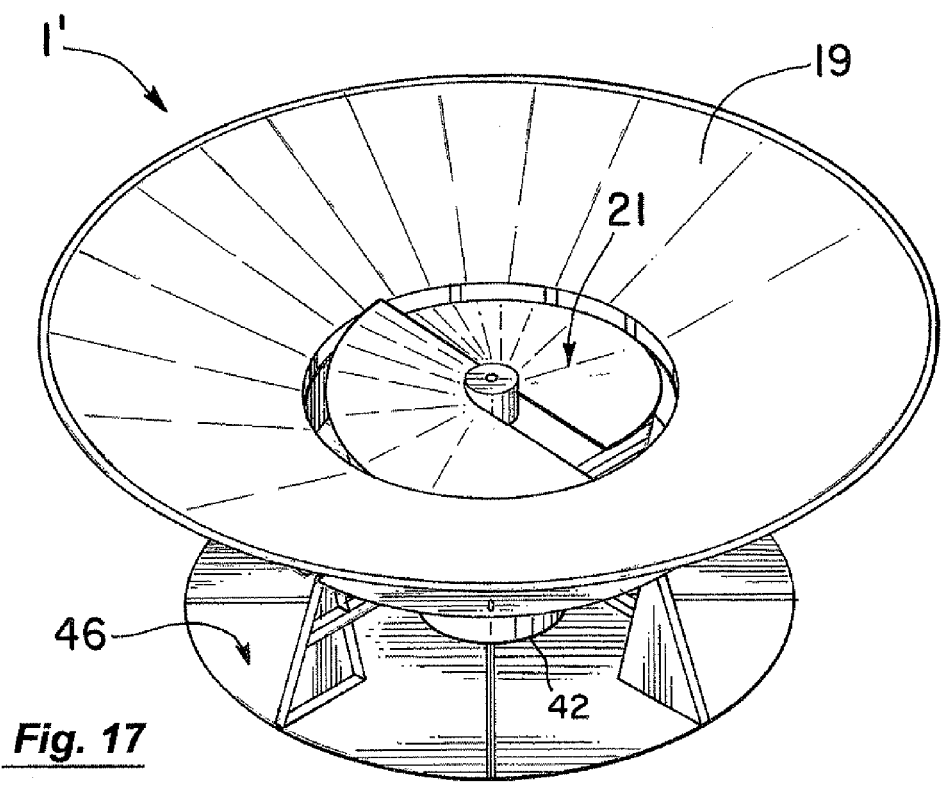
*Fig. 17*

WATER CIRCULATION SYSTEMS FOR PONDS, LAKES, AND OTHER BODIES OF WATER

RELATED APPLICATIONS

This application is a division of U.S. patent application Ser. No. 11/848,425 filed Aug. 31, 2007, which is a division of U.S. patent application Ser. No. 10/749,064 filed Dec. 30, 2003, now U.S. Pat. No. 7,285,208 issued Oct. 23, 2007, which claims the benefit of U.S. Provisional Patent Application Ser. No. 60/437,217 filed Dec. 31, 2002, all of which are incorporated herein by reference.

BACKGROUND OF THE INVENTION

1. Field of the Invention

This invention relates to the field of circulation systems for ponds, lakes and other bodies of water and more particularly to the field of such circulation systems for relatively large and deep bodies of water that require fairly high flow rates to be most effective and systems for smaller bodies such as municipal wastewater ponds that are designed primarily for treating domestic and industrial wastes and have special requirements to be effective.

2. Discussion of the Background

In regard to larger and deeper bodies of water that require high flow rates to be most effective, the fundamental goal of such systems is to create a nearly laminar surface flow out to the edges of the pond while uplifting water from the bottom depths of the pond. In doing so, the oxygen depleted water from the bottom depths is exposed to and absorbs oxygen from the atmosphere while undesirable gases such as hydrogen sulfide are passed off into the atmosphere. Additionally, an overall circulation pattern is generated in the pond that mixes the reaerated water throughout the entire pond. Such mixing in turn accelerates the biological and solar processes that clean up the water. The resulting cleansing is particularly desirable as it relates to controlling or removing weed growth, algae bloom, sludge buildup, fish kills, odors, high amounts of nitrogen and phosphorus, acidity, suspended solids, and other conditions.

Power availability to run the pump or impeller of the circulation system and seasonal weather conditions (e.g., surface ice) present great design challenges for optimum performance. Remote ponds or other bodies of water can be a particular challenge as the only available power source may be solar energy. Yet, the impeller of the system preferably will be able to lift and induce the flow of relatively large volumes of water from relatively large depths, as for example 30 to 50 or more feet. Further, the upflow or lifting must be done in a manner that spreads the water gently and evenly across the surface of the pond in a nearly laminar flow pattern. Otherwise, the overall flow and mixing of the uplifted water will not reach the edges of the pond and will simply be concentrated in the immediate area of the impeller leaving the outer reaches of the pond stagnant and untreated.

In a well designed system as indicated above, the surface of the pond would be continually renewed with water drawn up from the bottom depths while maintaining a laminar surface flow out to the edges of the pond. The surface water will then absorb oxygen from the atmosphere while undesirable gases such as hydrogen sulfide pass out of the water into the atmosphere. Among other beneficial actions, such surface reaeration and subsequent mixing and diffusion of the aerated water throughout the depths of the pond will increase desirable aerobic activity. It will also reduce suspended and dissolved solids in the water increasing pond clarity and aiding sunlight penetration and heat transfer for further cleaning.

In circulation systems for smaller bodies of water such as municipal wastewater ponds for treating domestic and industrial wastes, the high flow circulation pattern throughout the entire body of water discussed above is not always effective to process the wastes and in some cases can be counterproductive. One problem in such smaller ponds (e.g., 5 to 15 feet deep) is that the domestic and commercial wastes are usually much stronger and more concentrated. Also, such municipal wastewater ponds rely on more complicated mechanisms including biological and chemical ones for treating and processing the waste. These mechanisms involve the establishment of an upper, aerobic zone and a lower, anaerobic zone. Each zone is essential for the proper and overall treatment and processing of the various and different waste materials and each zone has its own biological and chemical needs that are often the opposite of the other and often detrimental to the other. Consequently, any thorough and overall mixing of the entire pond as in the earlier high flow systems for larger bodies of water will normally destroy the two zones and the effectiveness of the wastewater treatment pond.

With these and other considerations in mind, the water circulation systems of the present invention were developed.

SUMMARY OF THE INVENTION

In one set of embodiments of the present invention that are primarily designed for larger and deeper bodies of water, a high flow circulation system is disclosed. The high flow system draws water up from the depths of a pond, lake, or other body of water for exposure to the atmosphere and generates a desirable, overall circulation pattern throughout the entire body of water. The system includes a flotation platform, dish, impeller, and draft tube depending from an annular housing. The dish is supported just below the surface of the water and the bottom of the dish is spaced from the top of the housing to create an annular opening.

In operation, water from the depths of the pond is uplifted by the impeller through the draft tube toward the housing and dish. In doing so and in the preferred manner of use, the uplifted water passes out not only up over the upper edge of the dish but also out the annular opening between the housing and the dish. Preferably, about ⅔rds of the volume of the uplifted water passes out the annular opening and ⅓rd continues upwardly into and out of the dish. With this design, a significantly higher flow rate can be handled by the system without creating undesirable turbulent flow at the surface of the pond or other body of water.

The impeller preferably includes two, half blades with diameters less than the diameters of the housing and the bottom of the dish. In this manner, a gap is created between the blades and the housing as well as the dish which generates less turbulence in the uplifted water. The smaller diameters also permit the vertical positioning of the impeller blades relative to the dish and housing to be adjusted. This adjustment in turn allows the proportions of the uplifted water discharged through the annular opening and over the top of the dish to be varied as desired.

The draft tube is specially constructed to have a neutral or slightly positive buoyancy and a cable arrangement is provided to selectively adjust the extended length and depth of the collapsible tube. The cable arrangement includes a spring to aid in protecting the main cable and tube from damage from the uplifting forces of surface waves on the flotation platform. Additionally, the arrangement includes a short length of cable positioned adjacent the spring which limits the maximum extension of the spring and overall cable arrangement to protect the draft tube from being stretched beyond its design limits. An electronic eutrophication control system can also included to create apatite from calcium and phosphate molecules present in the water.

In the set of embodiments specifically intended for use in relatively small (e.g., 5 acres) and shallow (e.g., 5 to 15 feet) municipal wastewater ponds, many of the structural features of the high flow systems are used but their operation is modified. As for example, the impeller is still used to create a laminar flow pattern out to the edges of the pond but instead of having the draft tube draw up relatively large volumes of water from adjacent the bottom of the pond, only a very small or metered amount is drawn up. The circulation path of the water created by the impeller is then concentrated and preferably limited to the upper aerobic zone (e.g., top 2 feet of the pond). In this upper zone, the circulating and aerating of the flow are most beneficial and advantageous to the biological and chemical actions of the upper zone. The lower anaerobic zone (e.g., bottom 2 feet of the pond) is then essentially left alone and unaffected by the circulating flow established in the upper zone. The proper environment for the desirable biological and chemical actions of the lower zone is then not destroyed (e.g., by introducing dissolved oxygen from the upper zone into the lower one). Similarly and because the upper and lower zones are substantially isolated from one another, the biological and chemical actions of the upper zone are not detrimentally harmed by being thoroughly mixed as in the high flow systems. Nevertheless, it is still desirable for the overall treatment of the wastewater in the pond to bring up and mix very small volumes from the lower zone into the upper zone. In the second set of embodiments, this is accomplished by structure and its operation in a very careful and controlled manner.

Other features and modifications to the parts and operation of the circulating systems of the present invention are also disclosed to adapt them for use in additional environments and situations.

BRIEF DESCRIPTION OF THE DRAWINGS

FIG. 7 is a view similar to FIG. 4 with the impeller blades shown in a lowered position and further illustrating the cable arrangement for controlling the depth of the draft tube and protecting the main cable and tube from damage due to surface waves.

FIG. 8 is a view taken along line 8-8 of FIG. 7.

FIG. 9 illustrates the operation of a safety feature of the cable arrangement wherein the spring of FIG. 7 expands to absorb the uplifting force of a surface wave on the flotation platform and protect the main cable from damage.

FIG. 10 illustrates the operation of the short length of safety cable adjacent the spring to protect the spring and more importantly the tube from being stretched beyond their design limits.

FIGS. 13 and 14 schematically illustrate difficulties in setting the proper depth of the inlet to the draft tube of circulating systems like those of FIG. 1 in the environment of a wastewater treatment pond in which it is desirable to have both aerobic and anaerobic zones.

FIG. 16 is a view taken along line 16-16 of FIG. 15.

FIG. 16a is an enlarged view of a portion of FIG. 16.

FIG. 17 is a perspective view of the dish, impeller, housing, and plate member of the circulating system of FIG. 15.

DETAILED DESCRIPTION OF THE INVENTION

Figure 1:
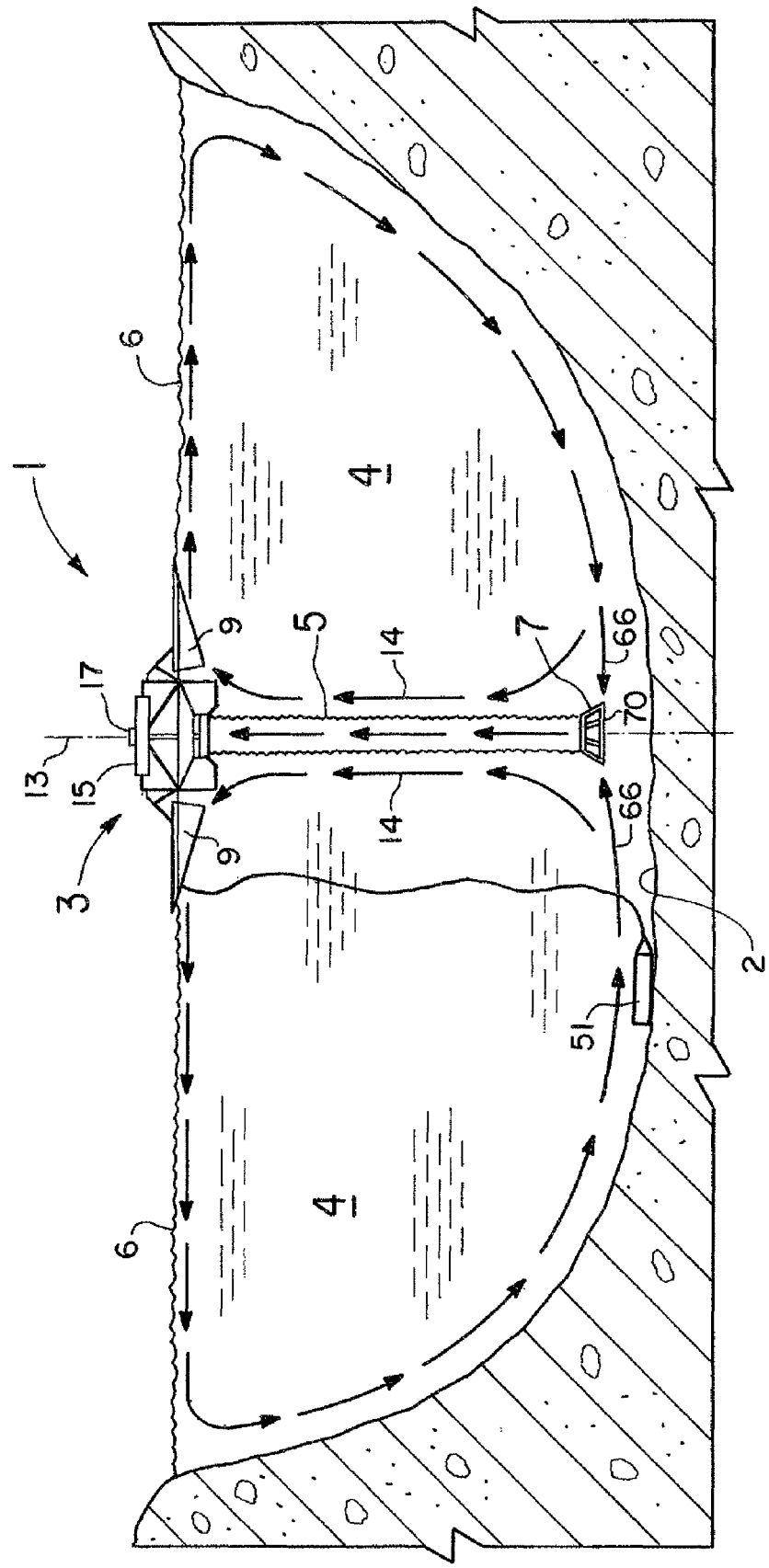
FIG. 1 is a cross-sectional view of the circulation system of a first set of embodiments of the present invention in use to create an overall flow pattern out to the edges and down to the depths of the pond or other body of water.
Figure 2:
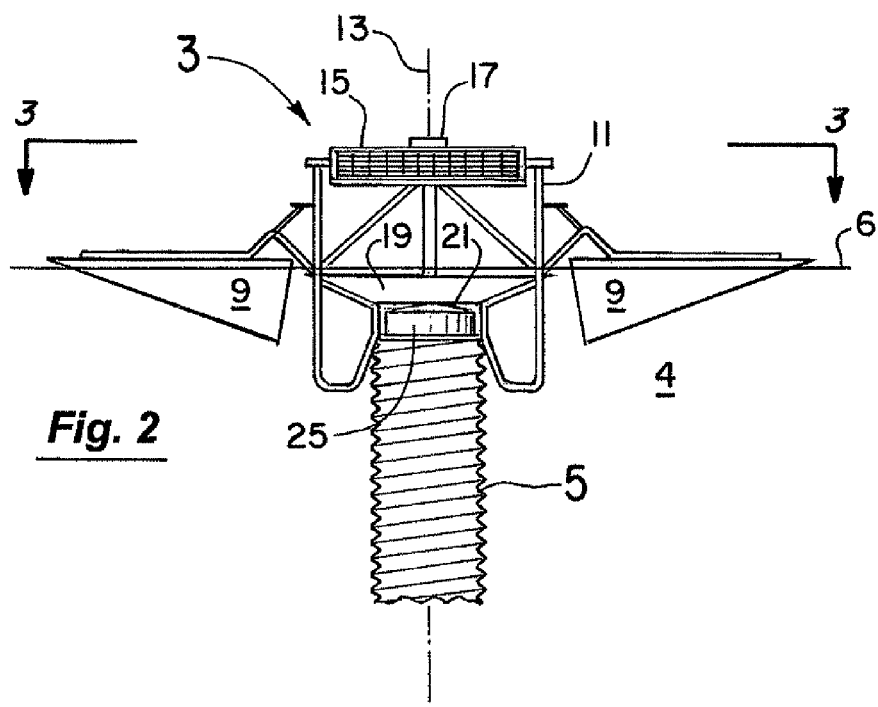
FIG. 2 is an enlarged view of the flotation platform of the system.
Figure 3:
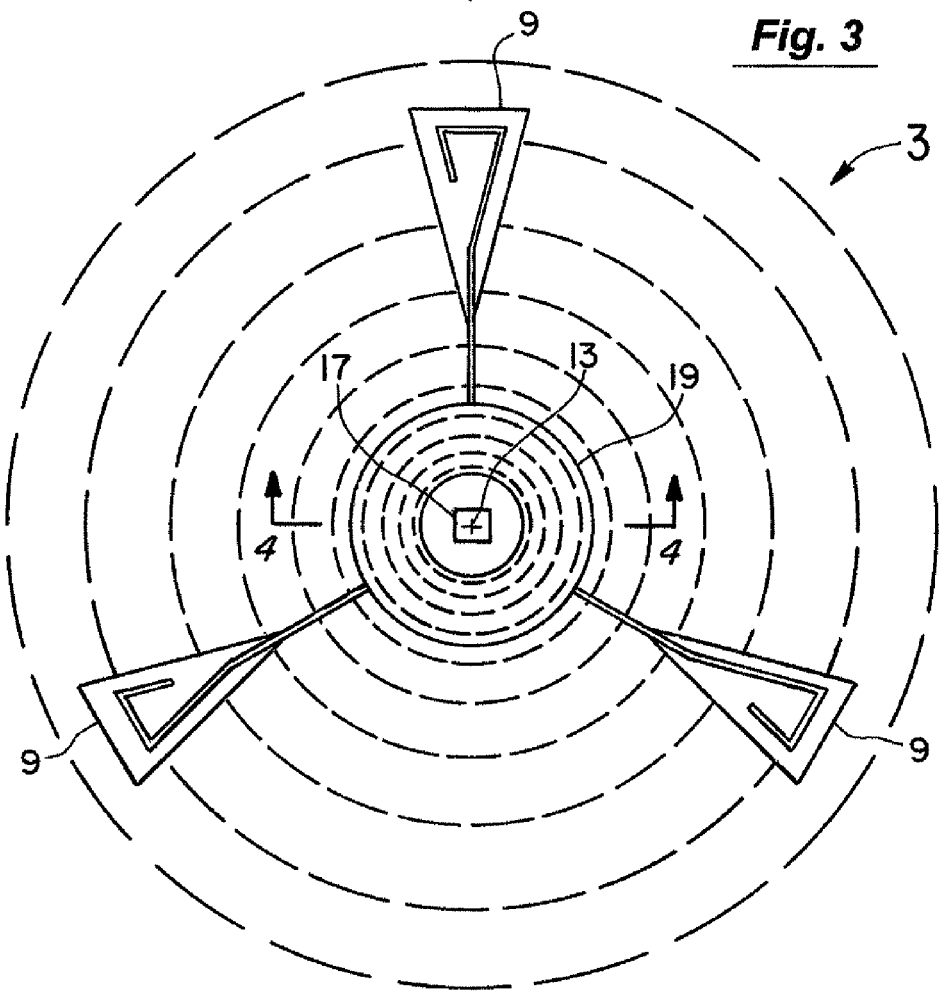
FIG. 3 is simplified, top plan view taken generally along line 3-3 of FIG. 2 showing the flotation platform and the laminar surface flow created circumferentially about the dish of the present invention.
Figure 5:
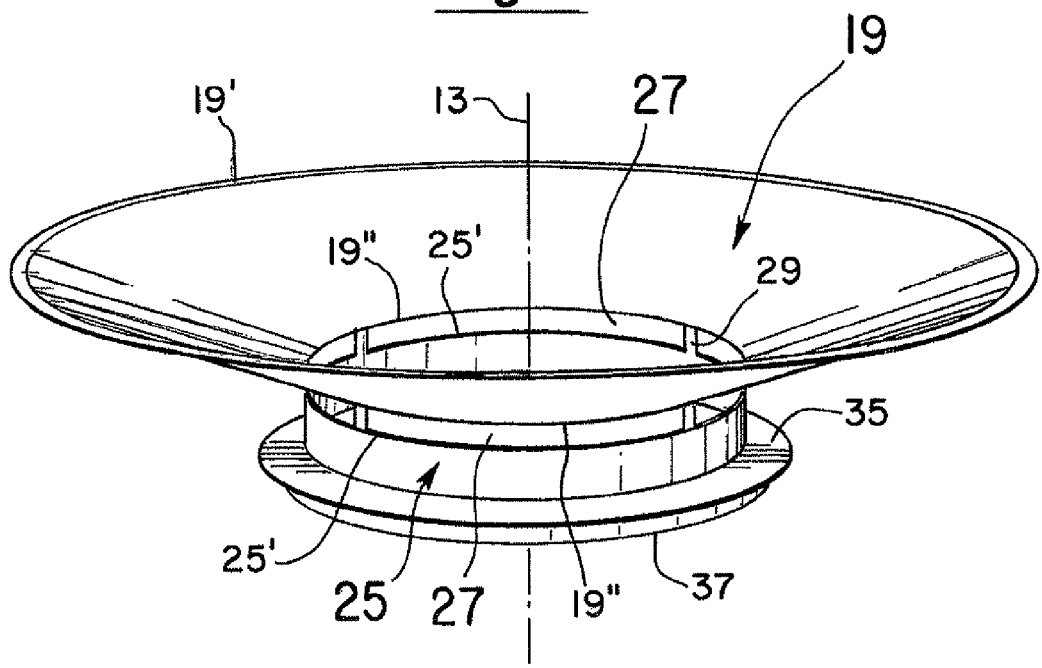
FIG. 5 is a perspective view of the dish and housing of the present invention showing the annular opening created between them.
Figure 6:
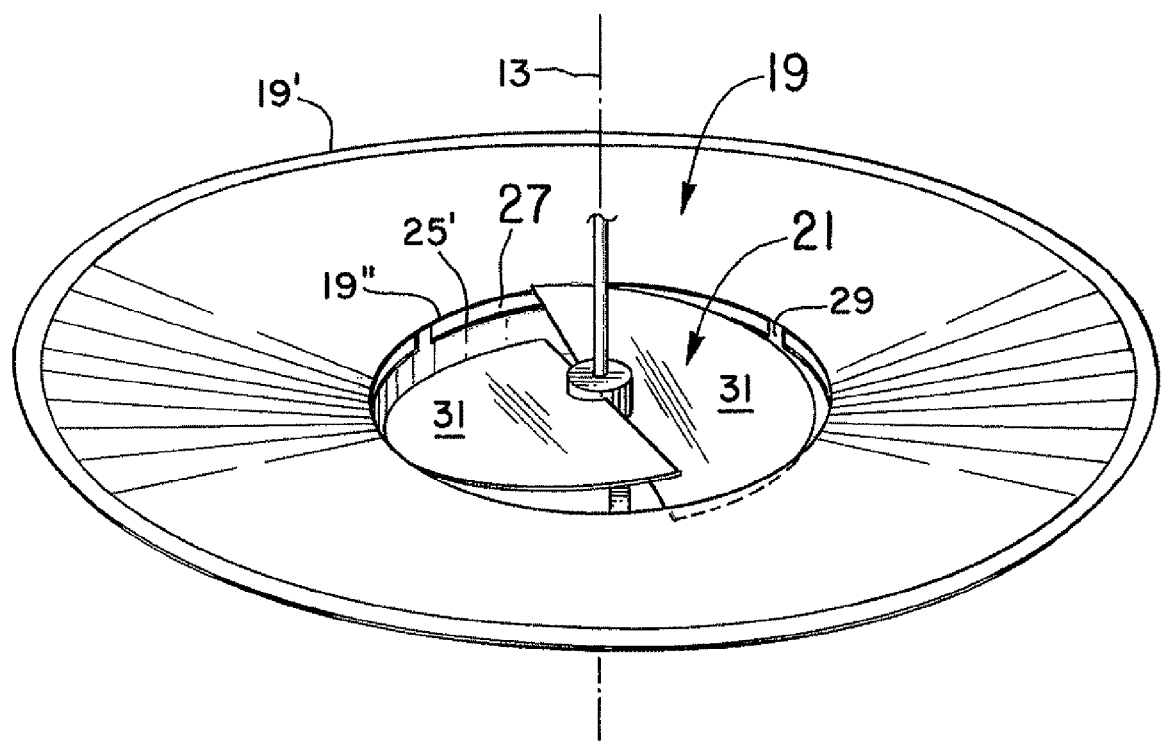
FIG. 6 is a perspective view similar to FIG. 5 but additionally showing the preferred positioning of the impeller blades relative to the dish and housing.

As schematically shown in FIG. 1, the water circulation system 1 of a first set of embodiments of the present invention includes an upper flotation platform 3 with a draft hose or tube 5 depending downwardly from it to the water inlet 7. The inlet 7 is preferably positioned adjacent and slightly raised from the bottom 2 of the pond or other body of water 4. The flotation platform 3 as best seen in FIGS. 2 and 3 includes three floats 9 supported on the tubular frame 11 of the platform. The floats 9 extend outwardly of the central axis 13 and are preferably evenly spaced about the axis 13 (see FIG. 3). The floats 9 extend far enough out from the central axis 13 to provide a relative stable and buoyant support structure for the system 1 including its solar panels 15, electric motor 17, dish 19 (see also FIGS. 4 and 5), impeller 21 (see also FIGS. 4 and 6), draft hose 5, and the water inlet 7 of FIG. 1. As explained in more detail below, the draft hose 5 is also specially designed to be essentially neutrally or slightly buoyant over its length, further adding to the stability of the system 1.

The overall buoyancy of the system 1 and in particular the platform 3 is preferably designed to support the upper edge or lip 19' (see FIG. 4) of the dish 19 about 3 inches or so below the surface 6 of the pond or other body of water 4. Additionally, as perhaps best seen in FIG. 4, the bottom edge 19" of the dish 19 is spaced (e.g., 1.5 inches) from the upper edge 25' of the housing 25 to create an annular opening 27 extending about the axis 13 (see also FIG. 5). Spacers 29 as illustrated in FIG. 5 support the dish 19 and housing 25 apart to create the opening 27. The spacers 29 preferably are as few and small as possible so that the opening 27 extends substantially continuously and completely about the central axis 13. Preferably, the total amount of the opening 27 is at least 320 degrees or higher about the axis 13 with the spacers 29 then obscuring only a relatively small amount of the remaining 360 degrees.

As explained in more detail below, the impeller 21 is vertically adjustable along the axis 13. However, in the preferred positioning of FIGS. 4 and 6, the two cross blades 31 of the impeller 21 are symmetrically centered with half of each blade 31 above and below the horizontal plane of the lower dish edge 19", (see FIG. 4). In this regards the diameter of the dish 19 at the top or upper edge 19' is about 6 feet. The dish 19 itself is approximately 6 inches deep and slopes downwardly and inwardly to the bottom or lower edge 19", which has a diameter of about 30 inches. The blades 31 of the impeller 21 are preferably about 27 inches across with the outer edges or tips being vertically spaced from each other about 4 inches. Each half blade 31 is inclined to the vertical axis 13 at about 15 degrees. The annular housing 25 in FIG. 4 (which essentially forms the upper end portion or outlet for the flexible draft tube 5) is approximately 30 inches in diameter. The housing 25 has an outwardly extending flange 35 (see FIG. 4) to which the depending flange 37 is affixed. The diameter of the depending flange 37 is about 36 inches. The upper rim of the flexible draft hose 5 (see FIG. 4) then extends about the depending flange 37 and is secured thereto by a band clamp 39.

Figure 4:
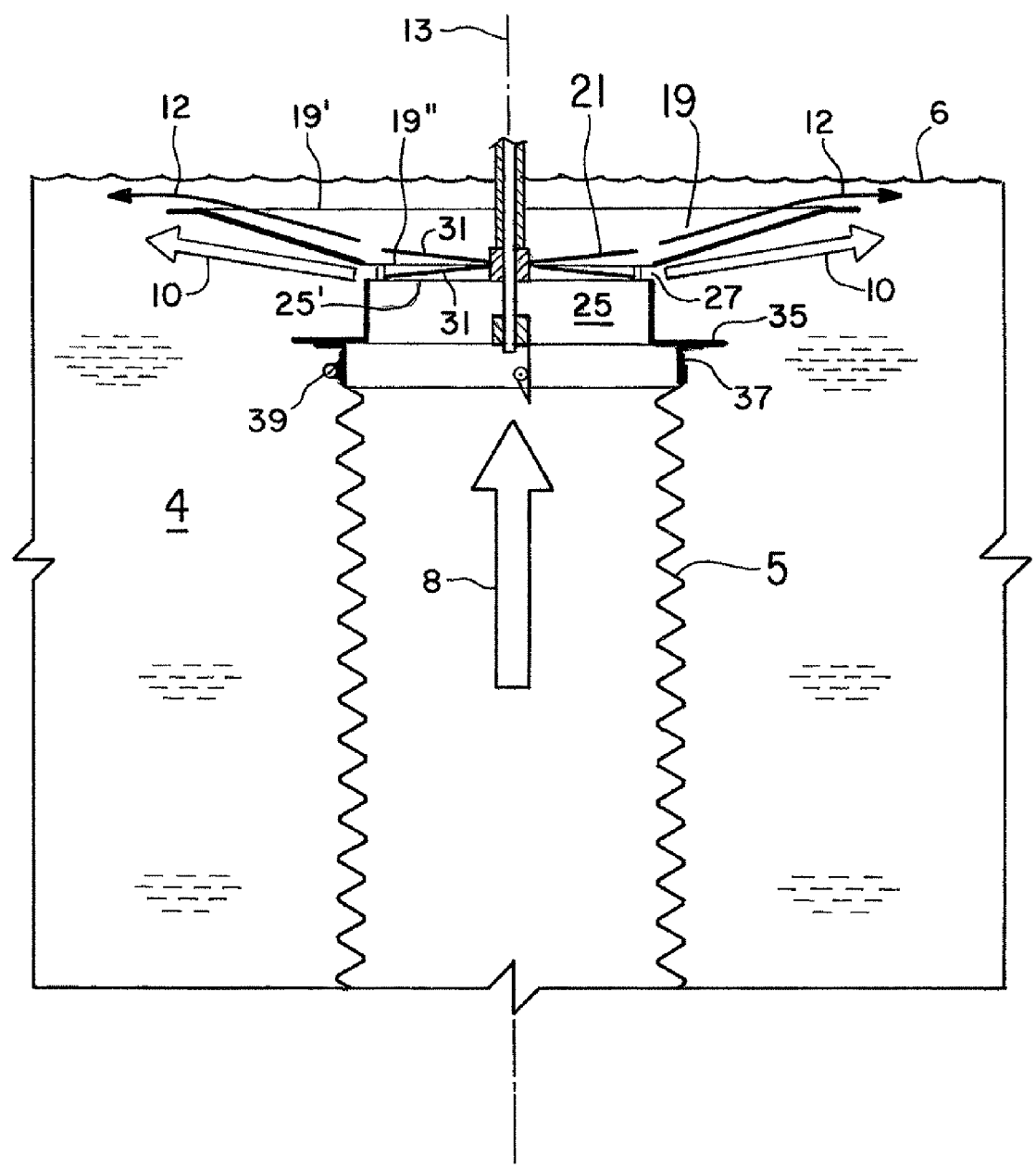
FIG. 4 is a view taken along line 4-4 of FIG. 3 illustrating the details of the flotation platform including the annular opening between the bottom of the dish and the top of the housing attached to the draft tube.

In operation as best seen in FIGS. 1 and 4, the impeller 21 (FIG. 4) is rotated about the axis 13 to draw water into the bottom inlet 7 (FIG. 1). The water is then uplifted through the draft hose 5 toward the housing 25 and dish 19. In doing so and in the preferred manner of operation, the volume of uplifted water (represented schematically by arrow 8 in FIG. 4) passes out not only up over the upper edge 19' of the dish 19 but also out the annular opening 27 between the housing 25 and the dish 19. Preferably, about ⅔rds of the volume of the uplifted water 8 passes out the annular opening 27 (schematically represented by arrows 10) and ⅓rd continues upwardly into and out of the dish 19 (see arrows 12). The uplifted water 8 in FIG. 4 is then discharged both below and above the dish 19.

In this last regard, it was discovered in using water circulation systems such as those of U.S. Pat. Nos. 6,433,302 and 6,439,853 (which are incorporated herein by reference) that significantly higher flow rates were needed to treat larger and deeper bodies of water. However, when the flow rates of the prior designs were increased, the surface discharge from the dish became undesirably turbulent. That is, when the flow rate was increased (e.g., from 450 gallons per minute to 3000) in order to generate the desired circulation pattern of FIG. 1 in larger and deeper bodies of water (e.g., 300 acres at 30 feet versus 30 acres at 12 feet), the surface discharge of FIG. 3 from the 6 foot dish of the prior designs no longer remained laminar. Consequently, the turbulent surface flow outwardly of the top of the dish only carried out to cover about a 5 acre circle (versus the normal 30 acre circle of such devices with the lesser but laminar surface flow). Lowering the upper edge of the dish more than 1 inch below the water surface of these prior devices did not help as the surface flow was still turbulent at the higher flow rates. It was contemplated to use a larger dish (e.g., 18 foot diameter versus 6) but this was not commercially feasible for manufacturing and shipping reasons. It was then discovered that by providing an annular opening 27 between the bottom of the dish 19 and the top of the housing 25, the circulation system 1 of the present invention could handle significantly larger flow rates (volumes) without creating undesirable surface turbulence. Further, the system 1 could do so still using only a relative small (e.g., 6 foot) dish 19. The increased flow rate additionally induced much larger flows 14 (see FIG. 1) along the outside of the draft tube 5 further enhancing the ability of the present invention to treat much larger and deeper bodies of water than the prior devices. Even in smaller and shallower ponds that previously used a plurality of the prior devices for complete treatment, the present design was more efficient as fewer of them were needed to accomplish the same results. In most cases, a single system of the present design could replace four to six of the prior designs.

It is noted that in the prior systems of U.S. Pat. Nos. 6,433,302 and 6,439,853, their impellers were positioned completely in the dish above the plane of the lower edge of the dish. Further, the blades of their impellers extended outwardly beyond the diameter of the lower edge of the dish as well as the diameters of the housing and draft tube below it. The positioning of the impeller and its blades in this regard was limited to being in the dish. In contrast, the blades 31 of the impeller 21 of the present invention have diameters (e.g., 27 inches) less than the diameter (e.g., 30 inches) of the lower dish edge 19", and the housing 25 below it. Consequently, there is a 1.5 inch annular gap or spacing between the outer diameter of the blades 31 and the circumferences of the lower dish edge 19" and the housing 25. Additionally, each blade 31 as discussed above is preferably positioned half above and half below the horizontal plane of the lower dish edge 19" (see FIGS. 4 and 6). By so dimensioning the diameters of the blades 31 to be smaller and positioning the blades 31 as discussed above, it was discovered that the blades 31 could lift a significantly higher volume of water than those of the prior devices (e.g., 3000 gallons per minute versus 450). Additionally, this could be done running the blades 31 at lower revolutions per minute than in the prior devices (e.g., 100 versus 150) and using less wattage (e.g., 80 watts versus 96). In terms of gallons per minute of flow per watt of energy used, the gain over prior devices was about 800 or more percent (e.g., 35 gpm/watt versus 4-4.5).

This performance improvement is believed to be due in part to a reduction in the turbulence and bounce back of the water outwardly against the housing 25 and draft tube 5 as the water is being uplifted by the impeller 21. Similarly, it is believed that with the gap versus a positive displacement arrangement, the lifting effect of the blades 21 induces a less turbulent flow along the walls of the draft tube 5. In this regard, the blades 31 (with 27 inch diameters as projected on a plane perpendicular to the axis 13 and together extending completely about the axis 13) preferably occupy about 80-90 percent of the cross-sectional area of the 30 inch diameter housing 25. The gap is then believed to work in conjunction with the upward water flow through the draft tube 5 to allow the water coming off the sides of the impeller 21 to turn and flow upward instead of tangentially outward and away from the center of the impeller 21. In operation and with reduced turbulence and bounce back, less energy is lost and higher flow rates are achieved. Empirically, it was determined that without the annular gap or spacing, the flow rate dropped 20 percent. The gap together with the slower rotation of the impeller 21, larger diameter blades 31, and larger pitch or bite of the blades 31 (e.g., 4 inches versus 1) all contribute to significantly improving the overall performance of the present system over prior designs.

The higher flow rate of the present invention additionally enables the dish 19 to be submerged lower below the surface 6 of the water (e.g., from 1 inch in the prior devices to 3 inches). The advantage of being able to lower the dish to 3 inches is particularly significant in many locations in that on a cold night, a 1 inch thick layer of ice can easily form on the water surface. Consequently, when the sun comes up and the impeller is restarted, the top of the dish of prior devices would often be completely plugged by the ice layer and no flow could pass out over the top of the dish. In an effort to overcome this, very small and narrow, radial slits in the dish were provided in the main body of the dish of the prior devices. The purpose of these radial slits was to allow a very limited amount of upward flow of warmer water from the bottom of the pond in an effort to melt the ice cap. In normal operation, no flow would pass through these radial slits and it was only when ice plugged the top of the dish that it would. However, even then, it was not enough in most cases to efficiently melt the ice cap and it was necessary to wait for the surface conditions (e.g., sun) to improve to melt the ice. In contrast and with the present invention, the dish 19 can be submerged lower in the water (e.g., 3 inches versus 1) so that it is less likely an overnight freeze will create a blocking cap. Further, even if it does, the annular opening 27 between the dish 19 and housing 25 will permit high volumes of water to pass out (e.g., 80 percent of the normal capacity of the impeller 21 or about 2400 gallons per minute). This will create an overall circulation pattern similar to the one of FIG. 1 to begin treating the water. It will also bring up significant amounts of the warmer water from the bottom 2 to help melt the ice cap above the dish 19. The uplifted water will then also begin melting the surface ice outwardly of the dish 19 to eventually establish the full surface and subsurface circulation pattern of FIG. 1.

As mentioned above, the impeller 21 of the present invention is vertically adjustable relative to the dish 19 and housing 25 (which essentially forms the upper end portion or outlet for the draft tube 5). As perhaps best seen in FIG. 7, the electric motor 17 for the impeller 21 is mounted on a plate 41 that can be raised or lowered relative to the frame 11 by rotation of the threaded bolts 43. That is, by rotating the bolts 43 relative to the nuts 45 affixed to the plate 41, the plate 41 and motor 17 can be raised or lowered as desired. The advantage of this adjustability is that the relative proportion of the uplifted water 8 in FIG. 4 that passes out the opening 27 versus up and over the dish 19 at 12 can be varied. As for example and by lowering the motor 17 (including the shaft 47 and attached impeller 21) to the position of FIG. 7, a higher percentage of the uplifted water in the draft tube 5 will pass out the opening 27 than in the raised position of FIG. 4. Conversely, if it is desirable for a particular operating condition to have more of the uplifted water pass up and out over the top of the dish 19, the impeller 21 can be raised toward or beyond the position of FIG. 4. As mentioned above, the relative portions of the uplifted water passing out the annular opening 27 versus up through and out the top edge 19' of the dish 19 in FIG. 4 is about 2:1. However, by adjusting the vertical positioning of the impeller 21, this ratio can be varied as desired to be higher (e.g., 3:1) or lower (e.g., 1:1).

As briefly mentioned above, the draft hose or tube 5 is preferably designed to be neutrally or slightly positively buoyant. It is also designed to be collapsible from an extended length of about 26 feet down to four feet for ease of shipping and handling. Additionally, the extended length of the hose 5 has been made to be adjustable for use in bodies of water of different or varying depths. In this manner, the water inlet 7 (see FIG. 1) of the hose 5 can then be positioned as desired relative to the bottom 2 of the body of water 4. The inlet 7 in this regard essentially forms the lower end portion of the draft tube 5. Preferably, the inlet 7 in most cases does not actually rest on the bottom 2 but is slightly raised (e.g., 3-4 feet) above it. Another feature of the draft hose 5 of the present invention is an arrangement to allow for dampening the effect of surface waves (which in larger bodies of water can often be quite significant) and protecting the structure of the system 1 from being damaged.

In further reference to the hose 5 of the present invention, the increased length of the hose 5 for use in deeper bodies of water than in previous devices presented significant weight and adjustment problems. To overcome the weight problem and to allow for adjustment of the overall length of the tube 5, the hose 5 was made to be neutrally or slightly positively buoyant and given a collapsible, accordion or bellows design whose collapsible walls extend between the upper and lower end portions of the draft tube or hose 5. The hose buoyancy was achieved by spirally wrapping styrofoam ribbon into the hose walls along with stainless steel wire, fiber, and plastic reinforcements. The slats of the hose walls in this regard are preferably about 3 inches and will collapse down from about 26 feet to about four feet. In use as illustrated in FIG. 1 and with the anchor 51 on the bottom 2 of the body of water 4, the bellows or accordion-shaped hose 5 is extended under the weight (e.g., 30 pounds) of the inlet 7 to a position just slightly raised (e.g., 1-4 feet) from the bottom 2. To accomplish this, a steel cable 53 (e.g., ⅜ths inch) is run as shown in FIG. 7 from the reel 55 through the bracket 57 and downwardly where the cable 53 is attached by a dampening spring 59 to the inlet 7. The bracket 57 depends from the vertical vane 61 (see FIG. 8) which is mounted across the housing 25 and which also supports the lower bearing 63 for the impeller shaft 47. The vertical vane 61 is positioned below the impeller 21 and also serves to limit the circular or vortexing flow of the uplifted water in the draft tube 5. In further reference to the hose 5 of the present invention, the increased length of the hose 5 for use in deeper bodies of water than in previous devices presented significant weight and adjustment problems. To overcome the weight problem and to allow for adjustment of the overall length of the tube 5, the hose 5 was made to be neutrally or slightly positively buoyant and given a collapsible, accordion design. The hose buoyancy was achieved by spirally wrapping styrofoam ribbon into the hose walls along with stainless steel wire, fiber, and plastic reinforcements. The slats of the hose walls in this regard are preferably about 3 inches and will collapse down from about 26 feet to about four feet. In use as illustrated in FIG. 1 and with the anchor 51 on the bottom 2 of the body of water 4, the bellows or accordion-shaped hose 5 is extended under the weight (e.g., 30 pounds) of the inlet 7 to a position just slightly raised (e.g., 1-4 feet) from the bottom 2. To accomplish this, a steel cable 53 (e.g., ⅜ths inch) is run as shown in FIG. 7 from the reel 55 through the bracket 57 and downwardly where the cable 53 is attached by a dampening spring 59 to the inlet 7. The bracket 57 depends from the vertical vane 61 (see FIG. 8) which is mounted across the housing 25 and which also supports the lower bearing 63 for the impeller shaft 47. The vertical vane 61 is positioned below the impeller 21 and also serves to limit the circular or vortexing flow of the uplifted water in the draft tube 5.

In initial operation to lower the draft tube 5, the locking bolt 65 of FIG. 7 on the hand crank 67 is first raised. The crank 67 can then be rotated about the axis 69 to release enough cable 53 from the reel 55 to lower the inlet 7 and attached tube 5 to the desired depth. This is normally done by simply lowering the inlet 7 to the bottom 2 and raising it 1-4 feet or until the flow at the dish 19 has the desired appearance representing the desired depth for best treatment of the water. In some cases, the depth of the bottom 2 may exceed the designed limit (e.g., 26 feet) of the hose 5. Consequently, the maximum length of cable on the reel 55 is set accordingly not to exceed this limit.

When used in larger bodies of water, relatively large waves may be generated by wind or recreational boats raising and lowering the flotation platform 3 several feet or more. To protect the cable 53 and hose 5 from damage from such fluctuations, the cable 53 as illustrated in FIG. 7 is attached to the spring 59. The spring 59 (e.g., ⅜ths inch coil spring of steel similar to a car body spring) is about 2 feet long in FIG. 7. As the flotation platform 3 in FIG. 7 is raised by a wave, the rising cable 53 will stretch the spring 59 (see FIGS. 9 and 10) to absorb the lifting force of the wave. This in turn will minimize damage to the cable 53 as well as the hose 5, The action of the spring 59 will then let the flotation platform 3 move up and down with the surface waves without adversely affecting the operation of the surface components of the system or damaging the cable 53 or hose 5. As an additional safety precaution to prevent damage to the draft hose 5 from overstretching, the arrangement of FIG. 7 includes the short length or section (e.g., 5 feet) of cable 53'. This safety cable 53' as illustrated is attached between the top of the spring 59 and the inlet 7. In use as best illustrated in FIG. 10, the safety cable 53' will limit the maximum distance (e.g., 5 feet) the spring 59 and hose 5 will be stretched by a surface wave lifting the flotation platform 3. The spring 59 but more importantly the hose 5 will then not be overstretched and damaged beyond design limits. With the above features, the system 1 can be safely used in relatively large bodies of water where many different depth settings are needed (both initially and from season-to-season as drought and other conditions may vary the water depths). It can also be safely used in bodies of water where relatively large waves may be generated by the wind or other factors such as recreational boats.

It is noted that the hose 5 is described above as being about 26 feet in length in the discussed embodiments. This is a length that serves many existing bodies of water; however, the hose could certainly be longer (e.g., 80-100 feet or more) or made up of sections or multiples of 26 foot hoses such as hose 5. As for example, a series of such 26 foot hoses 5 could be secured to one another by housings such as 25 to extend 104 feet or more down with the inlet 7 then on the bottom section. The sections would still preferably collapse to a relatively short height (e.g., 16 feet in this example) for ease of handling and shipping.

Figure 11:
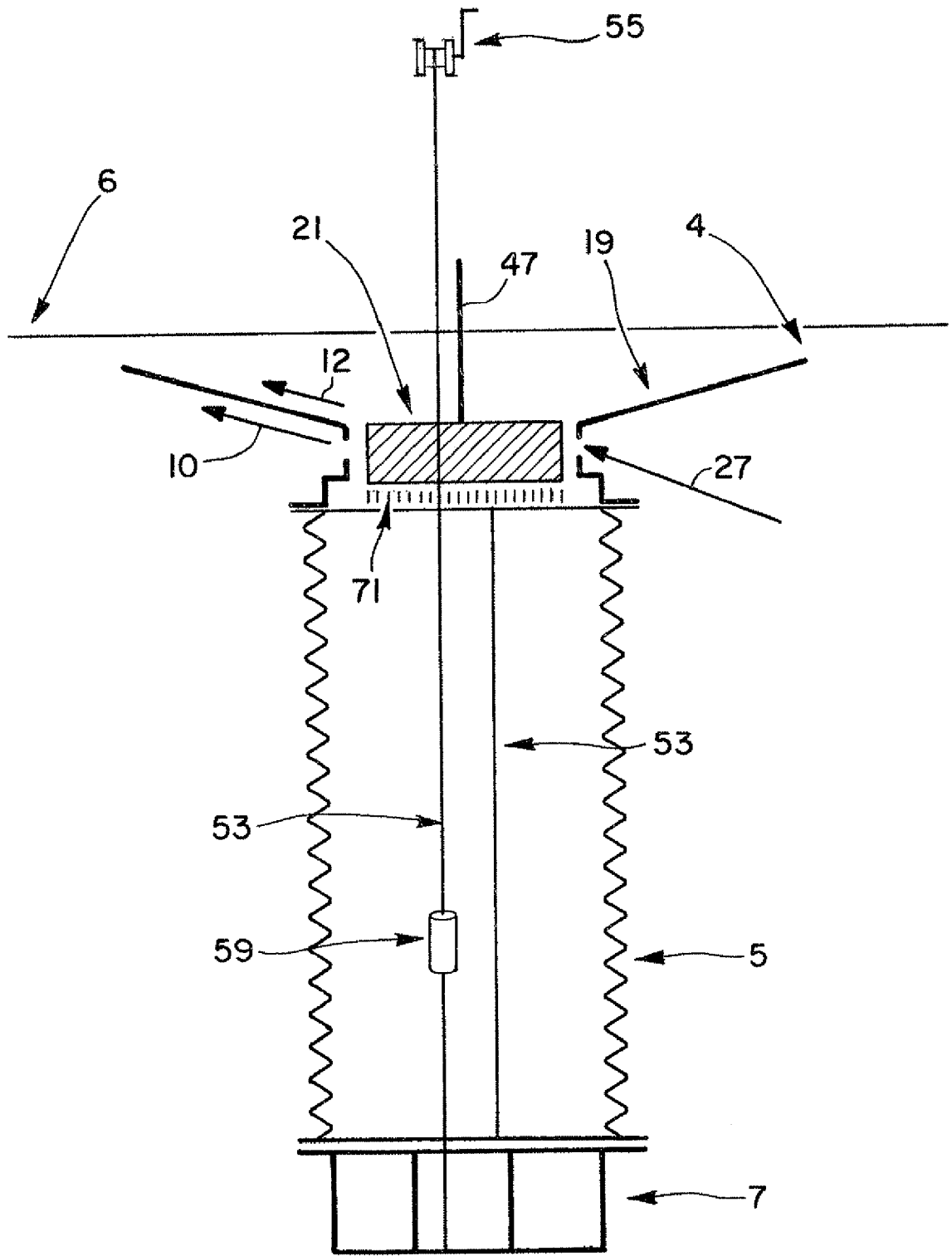
FIG. 11 schematically illustrates the circulation system of the present invention adapted to include an electronic eutrophication control system to create apatite from any calcium and phosphate molecules present in the water.

FIG. 11 schematically illustrates the circulation system 1 of the present invention adapted to include an eutrophication control system 71. In this regard, many lakes and wastewater reservoirs have excess dissolved phosphate which can lead to eutrophication. This is a condition where harmful algae blooms occur that can lead to low dissolved oxygen, fish kills, taste and odor in drinking water reservoirs, and other water quality problems. An estimated 60 percent of the reservoirs and lakes in the United States have such excess phosphate accumulations.

Phosphate is a highly polar molecule, with a positive (+) charge at one end and a negative (−) charge at the other end. It is believed that molecules like phosphate, when dissolved in water, become tightly surrounded by a sheath of water molecules since water molecules are also highly polar. The same thing is thought to occur with calcium hardness in water in which the calcium also becomes surrounded by a sheath of water molecules. In the case of calcium, it has been shown that if these sheaths of water are broken up (e.g., by magnetic fields as by putting a permanent or electromagnet around a pipe of flowing water or by passing a current through the water as by electrolysis or even sonic or ultrasonic waves), the calcium in the water has more exposed surface area and thus becomes more reactive. Small particles of calcium will then accumulate by surface attraction to each other forming relatively large clumps of calcium precipitate which will settle out of the water It has been known for some time that if phosphate and calcium are both present in water, and if the water is mixed, the two will combine in a surface-bonding manner to form a mineral called apatite. The apatite will then settle out to the bottom of the reservoir and will not easily go back into solution. It has also been demonstrated that slow mixing of algae-laden water aids the apatite formation process, probably due to molecular charges that exist on the biological film-type coating of the algae cells. However, the complete process is not well understood.

In the present invention of FIG. 11, a generator 71 has been added to the basic system 1 of FIGS. 1-10 to impart energy to the uplifted water (e.g., by generating a magnetic field, electric current (AC or DC), or sonic or ultrasonic waves across the flow). Preferably, the generator 71 is solar powered. The energy imparting generator 71 serves to break up the water sheaths surrounding both calcium and phosphate molecules so that they can more readily combine and form apatite. In this manner, the calcium normally present in abundance in ponds, lakes, reservoirs, and other bodies of water can be used to effectively reduce and precipitate out undesirable amounts of phosphate that may be in solution in the water.

Figure 12:
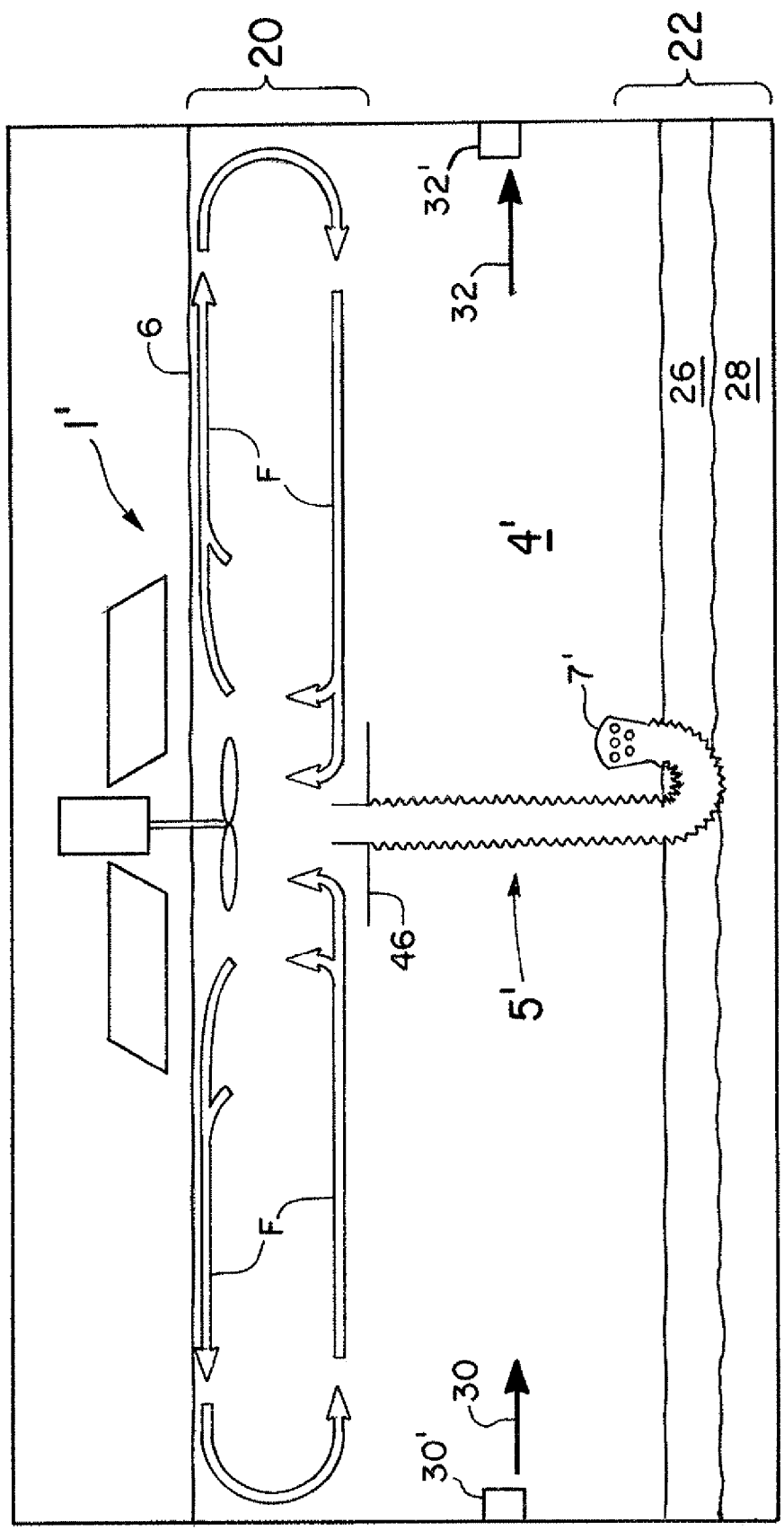
FIG. 12 schematically illustrates the preferred operation of another set of embodiments of the present invention in which an upper aerobic zone and a lower anaerobic zone are created and maintained in a wastewater pond.

FIG. 12 schematically illustrates another set of embodiments 1' of the present invention that are highly desirable in treating and processing bodies of water such as municipal wastewater ponds 4'. In such wastewater ponds 4', it is essential to establish an upper zone 20 for aerobic digestion using dissolved oxygen and a lower zone 22 with virtually no dissolved oxygen for anaerobic digestion of materials such as some organic wastes and chemical compounds. The ponds 4' themselves are typically 5 to 15 feet deep and the zones 20 and 22 are commonly about 2 feet each. Each zone 20 and 22 performs different but vital functions in the overall treatment and processing of the wastewater. Further, to be effective, the contents of the two zones 20,22 must be essentially isolated from one another. Yet, at the same time and for best overall results in the treatment and processing of the entire pond 4', it is desirable to have a small quantity of the contents of the lower zone 22 brought up and mixed with the contents of the upper zone 20.

To accomplish this, conventional aerators and circulation systems as well as the circulating system 1 in FIGS. 1-11 are very difficult to effectively use in the environment of a wastewater pond such as 4'. The fundamental problem is that such systems as 1 are primarily intended to create an overall flow 24 (see Schematic FIGS. 13 and 14) in the body of water 4' circulating from the bottom or inlet 7 of the draft tube 5 up to the surface 6, out to the water edges, and back down to the level of the tube inlet 7. In this light and if the tube inlet 7 is set too deep as schematically shown in FIG. 13, it will mix the entire pond 4'. In doing so, it will bring up large quantities of sulfides and low pH (e.g., 6) water from the bottom region of the pond 4', which will normally kill the desirable aerobic bacteria and algae of the higher pH (7.5) upper region. Such overall pond circulation 24 in FIG. 13 will also drive dissolved oxygen from the upper region of the pond 4' down into the lower region, which will kill the desirable methane forming and other bacteria necessary to prevent sludge buildup in the bottom layers 26 and 28. Odors then develop in the pond 4' of FIG. 13 due to the pulling up the sludge and there is no upper zone 20 as in FIG. 12 conducive to eliminating it as well as reducing the ammonia and precipitating out any phosphorous. Conversely to being set too deep, if the tube inlet 7 is set too shallow as in FIG. 14, a short circuit is developed where the incoming influent 30 from inlet 30' will essentially pass untreated through the pond 4' and out the effluent pipe 32'.

To set the depth of the tube inlet 7 in the systems of FIGS. 13 and 14 between these extremes is virtually impossible in the dynamic environment of wastewater ponds such as 4'. Among other things, such ponds 4' have changing overall depths depending upon the volume of influent 30 and effluent 32 as well as varying depth thermoclines and temperature gradients. The changing of the overall depth of the pond 4' has the effect of raising and lowering the surface level 6 and thus the level of the tube inlet 7 depending from the flotation platform. Thermoclines and temperature gradients in the pond 4' can also operate to effectively change the desirable level to set the tube inlet 7. As for example, the influent 30 typically enters the pond 4' (e.g., one or two feet above the sludge layer 26) at a different temperature (e.g., 1 to 20 degrees F. lower in the summer) than the pond water above it. A thermocline or gradient can then be created across the pond 4'. As the temperature difference varies over time (days or seasons) and/or the volume of the influent 30 and effluent 32 varies, the thermocline may rise or fall changing the desired level for setting the inlet 7. Too low a setting of the tube inlet 7 as discussed above will create the undesirable conditions of FIG. 13 and too high a setting will result in the undesirable conditions of FIG. 14.

To solve these problems, the embodiments 1' of FIGS. 12 and 15-22 were developed. With them, a circulating aerobic flow F (FIG. 12) in the upper zone 20 is created and limited to the upper 2 feet or so of the pond 4'. Additionally, a small volume of the contents of the lower anaerobic zone 22 is brought up and mixed into the circulating flow F of the upper aerobic zone 20. However, the zones 20 and 22 are essentially otherwise isolated from each other. In particular, no harmful dissolved oxygen from the upper aerobic zone 20 is driven down and mixed into the lower anaerobic zone 22, which would destroy the beneficial methane forming and other bacteria of the lower zone 22. Further, variations in the overall depth of the pond 4' over time and varying thermoclines and temperature gradients created over time in the pond 4' largely do not affect the efficient operation of the embodiments 1'. This is the case because the embodiments 1' are essentially independent of such factors.

As indicated above, certain of the contents (e.g., sulfides) of the lower zone 22 can be detrimental to the desirable bacteria and algae of the upper zone 20. However, the bringing up of a very small volume of these contents as well as other contents can be beneficial to the overall treatment and processing of the wastewater in the pond 4'. More specifically, the lower zone 22 does have nutrients (e.g., carbon, nitrogen, and phosphorous) beneficial to a strong algae crop or growth. In particular, carbon from the lower zone 22 in the form of carbonic acid is very desirable to bring up to the upper zone 20 to nourish the algae. A strong algae crop in turn raises the pH of the upper zone 20 (e.g., to a level of 7.5 to 10). The elevated pH helps to process the liquid ammonium ions being brought up from the lower zone 22 through nitrification. Additionally, at the higher pH ranges (e.g., over 9.2 pH), virtually all of the liquid ammonium ions will be converted into ammonia gas and harmlessly dissipated or gassed off into the atmosphere. Heavy algae growth in zone 20 provides increased surface area for attachment of beneficial nitrifier bacteria needed for the nitrification and denitrification process of ammonia removal. Further, the higher pH's in the upper zone 20 help to precipitate out calcium hardness.

The upper zone 20 and its algae growth are normally limited to the first 2 feet or so of the pond 4' This is due in part to natural factors (e.g., sunlight typically is greatly diffused at depths greater than 2 feet in such ponds 4'). It is also due to the mechanical operation of the embodiments 1' which serve to confine and substantially limit the circulating flow F in FIGS. 12 and 19 to about 2 feet. Further, and in addition to the movement of the circulating flow F physically limiting any descent of the algae growth below 2 feet, a thermocline is establish at the level of the plate member 46 (as explained in more detail below) to inhibit any decent of the algae below it. Algae is then not mixed below the level of the plate member 46 (e.g., 2 feet) in normal winds and other operating conditions. In this way, little if any algae passes down and out of the effluent pipe 32' in FIG. 12 in violation of governmental and other guidelines on the amount of such biochemical oxygen demand materials that can be present in the discharging effluent 32.

Figure 15:
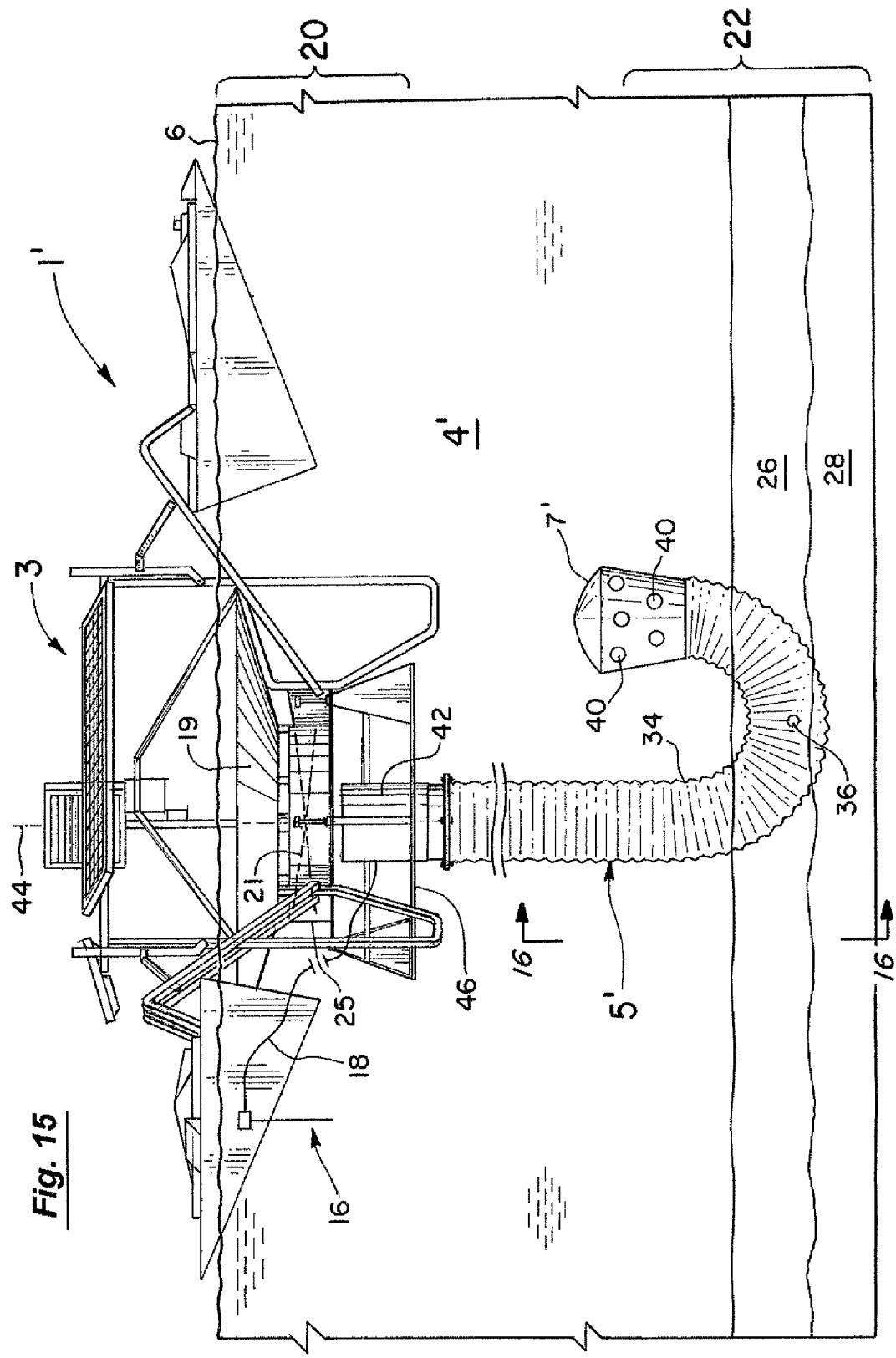
FIG. 15 illustrated the overall structure of the preferred embodiment to create the desired circulation system of FIG. 12.
Figure 18:
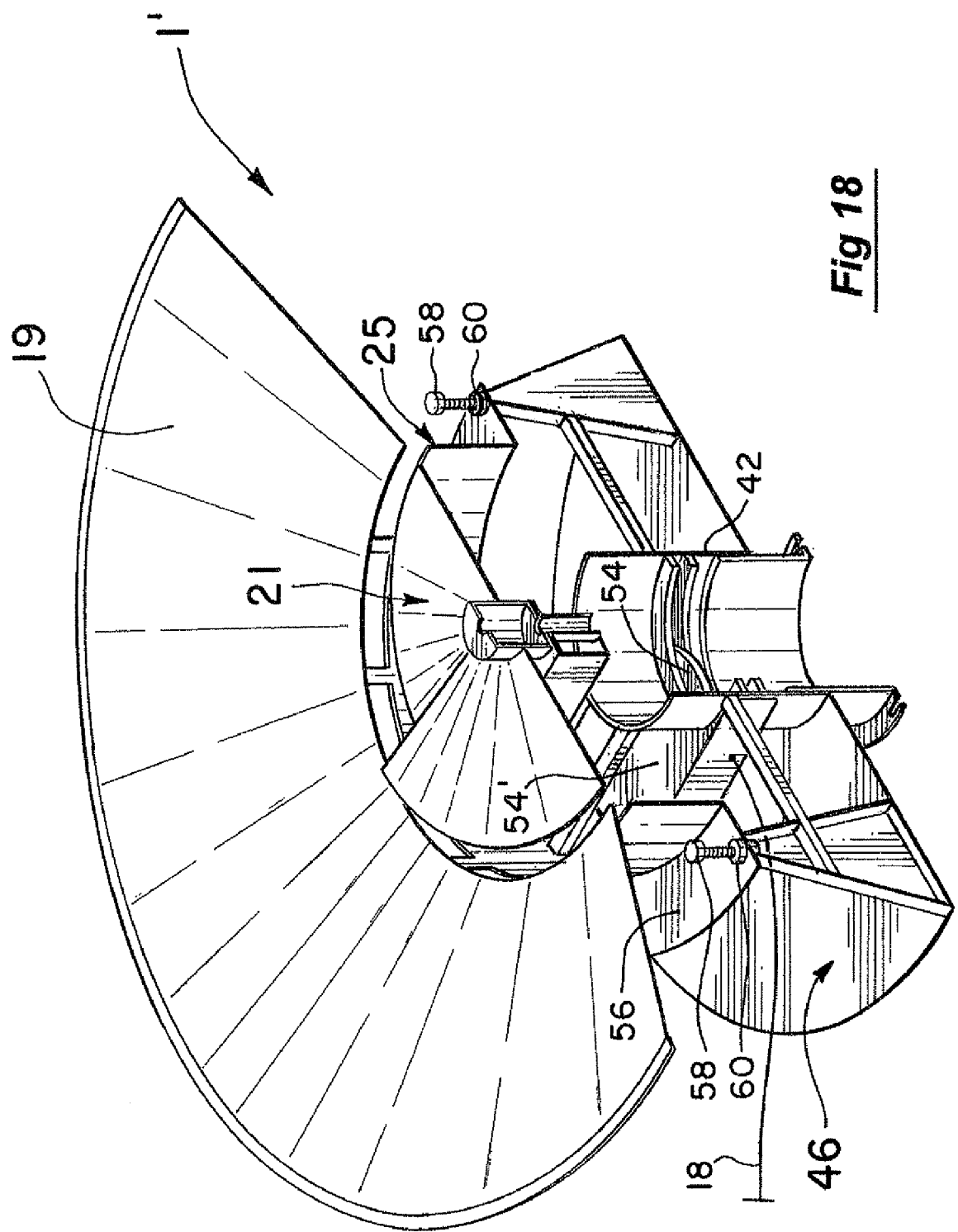
FIG. 18 is a cut away view of FIG. 17.

Referring to FIGS. 15-18, the embodiments 1' of the present invention are specifically designed for the environment of wastewater ponds 4' but preferably have many of the same parts as the embodiments of FIGS. 1-11. As for example, the flotation platform 3 (FIG. 15) is essentially the same as well as the dish 19, impeller 21, and housing 25. Also like the earlier embodiments 1, the embodiments 1' have a draft tube 5' but unlike the earlier embodiments 1', the draft tube 5' has an overall J-shape. The draft tube 5' is also designed to rest in the weight-bearing layer 28 of the sludge with the inlet 7' positioned slightly above (e.g., 1 foot) the slurry or non-weight bearing layer 26. In this regard, the bottom curve or bend in the main body 34 of the draft tube 5' in FIG. 15 can be provided with a bar or other weight 36 (see FIGS. 16 and 16a) secured in place by screws or other members 38. The main body 34 of the tube 5' then rests as illustrated in FIG. 15 in the weight-bearing layer 28 (e.g., capable of supporting 0.25 pounds per square inch) with the inlet portion 7' positioned as shown. The inlet portion 7' is preferably buoyant (e.g., by providing styrofoam floating balls in it). The exact location of the holes 40 in the inlet 7' can vary relative to the sludge layers 26 and 28 and the exact upper limits of the anaerobic zone 22 but ideally, at least the lower set of holes 40 are in the anaerobic zone 22. In any event, the resulting water being drawn through the holes 40 into the draft tube 5' will predominantly be components of the anaerobic materials of the lower zone 22. The weight 36 preferably then anchors the draft tube 5' in the sludge layers 26, 28 even if the flotation platform 3 drifts on the surface 6 to one side or the other. In doing so, the main body 34 of the relatively rigid, fixed length (e.g., 20 feet) tube 5' essentially lays somewhat on its side, descending at a slant or incline to the vertical (see FIG. 16 which is a view taken along line 16-16 of FIG. 15).

Referring again to FIGS. 15-18 and although the flotation platform 3, dish 19, impeller 21, and housing 25 are substantially the same as the embodiments 1 of FIGS. 1-11, the embodiments 1' for the wastewater ponds 4' have a modified supporting arrangement for the draft tube 5'. More specifically, the draft tube 5 of the earlier high flow embodiments 1 had the upper rim thereof (see FIG. 4) secured at 39 about the flange 37. Consequently, preferably all of the water fed to the impeller 21 came from the bottom of the pond 4 up through the draft tube 5. In contrast, the outlet portion 42 (FIG. 15) of the modified tube 5' is supported to feed only a small amount of the total water input fed to the impeller 21. This can be accomplished in a number of ways. As for example, the substantially cylindrical outlet portion 42 of the tube 5 passing up through the central opening in the plate member 46 as seen in FIGS. 15 and 17-19 preferably extends outwardly of the vertical axis 44 (FIG. 15) for a distance (e.g., 0.5 feet) less than the distance (e.g., 1.5 feet) the housing 25 so extends. Further, the supporting arrangement for the tube 5' includes this horizontally extending plate member 46 (see FIGS. 15 and 17-19) which is spaced vertically from and below the impeller housing 25. An inlet opening extending substantially about the vertical axis 44 is thus created therebetween leading to the impeller 21. Additionally, the plate member 46 extends outwardly of the vertical axis 44 (FIG. 19) for a distance (e.g., 2 feet) preferably greater than the distance (e.g., 1 foot) the annular housing 25 extends. Consequently, in operation, the impeller 21 draws a first volume of water 48 in FIG. 19 horizontally above the plate member 46. In doing so, a portion 48' (e.g., 30%) of the total volume of drawn water 48 (e.g., total of 10,000 gallons per minute) passes through the impeller 21 toward the surface 6 from the inlet opening between the plate member 46 and the housing 25. This portion 48' passes up and over the dish 19 at 12 as well as out the annular opening between the dish 19 and housing 25 at 10. This movement of the portion 48' in turn induces the remaining portion 48" (70%) of the first volume 48 to move upwardly about the housing 25. The circulating flow F (see also FIG. 12) is thus created and essentially defines the upper aerobic zone 20.

To this circulating flow F in the zone 20, a second, smaller volume 52 (see FIG. 19) is added which has been drawn up by the impeller 21 through the tube 5' from the lower zone 22. The second volume of water 52 drawn up through the tube 5' is preferably only a small fraction (e.g., $\frac{1}{100}$ to $\frac{1}{5}$) of the first volume 48. In this manner, the desired aerobic nature of the upper zone 20 is not adversely affected yet valuable reduction of some of the contents (e.g., ammonia and phosphate) of the lower zone 22 is performed adding to the overall treatment and processing of the wastewater pond 4'. Further, as discussed above, some beneficial contents (e.g., carbonic acid) are also brought up to nourish the desirable algae growth in the upper zone 20.

In any event, the second volume 52 allowed to be drawn up must be kept to a relatively small fraction of the circulating flow F so as not to adversely affect the aerobic makeup of the upper zone 20. This can be done in any number of ways. If the characteristics of the particular pond 4' are well known and defined, the diameter of the tube 5' can be selected as desired with a smaller or larger diameter resulting in more or less frictional drag to the flow of the second volume 52. A smaller diameter would thus create more drag and reduce the size of the second volume 52. The tube 5' can also be provided with a valve mechanism (e.g., gate valve 54 in FIGS. 18 and 20) to control and adjust the size of the second volume 52. The planar plate member 46 can also be adjustably supported to the flange 56 of the housing 25 by a bolt and nut arrangement 58 and 60 (see FIGS. 18, 20, and 21). In a manner similar to the operation of members 43 and 45 in FIG. 7, the distance between the plate member 46 and housing 25 can be varied by rotating the threaded bolts 58 in FIGS. 18, 20, and 21 to alter the size of the inlet opening between the plate member 46 and housing 25. Such movement will also vary the space between the end 62 (FIG. 21) of the outlet portion 42 of the tube 5' and the impeller 21 and housing 25. The spacing of the end 62 of the outlet portion 42 can also be separately adjusted by providing a concentric, sliding member 42' on the fixed member 42" of the outlet 42 in FIG. 21. The input through the inlet portion 7' could also be valved in similar manners. Regardless of the manner of adjustment, the absolute and relative sizes of the first and second volumes 48 and 52 are preferably variable as needed and desired.

Figure 22:
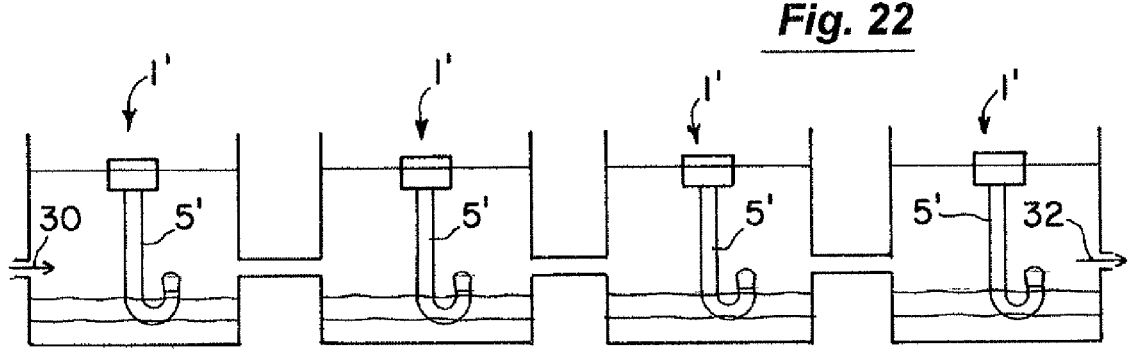
FIG. 22 shows the application of the second set of embodiments to treat a series of bodies of wastewater.

Another advantage of the adjusting techniques for the first and second volumes 48,52 is that essentially the same basic units 1' can be used in a series of wastewater ponds (see FIG. 22). In such a series, it is usually desirable to vary the fraction of the second volume 52. It is also normally the case that the influent 30 entering the first pond is the strongest and most concentrated wherein it is desirable to draw up only a very small fraction ($\frac{1}{60}$). The treated effluent leaving the first pond and entering the second pond would then be less concentrated and a larger fraction (e.g., $\frac{1}{40}$) could be drawn up the tube 5'. The fraction in the third pond could then be even larger (e.g., $\frac{1}{20}$) and the final still larger (e.g., $\frac{1}{5}$). The water passing through the series of ponds and exiting at 32 would then be progressively and efficiently treated.

The fraction (e.g., $\frac{1}{60}$) set for the first pond in FIG. 22 can be varied as discussed above. In doing so, the operating results of the pond can be monitored and adjustments made in the field if necessary. For an initial setting, however, the conditions of the pond can also be studied. As for example and in a pond with a surface area of about 5 acres, the upper and lower zones 20,22 may be considered as respective blocks of 1,000,000 pounds of water each. The lower zone 22 in summer might be mostly raw sewage with about 220 pounds per million of biochemical oxygen demand materials. The 220 pounds of material of the lower zone 22 would then need about 1.5 pounds of dissolved oxygen for fast odorless aerobic digestion. The lower zone 22 might also typically contain 30 pounds per million of liquid ammonium ions. Each pound of ammonium ions would then need about 5 pounds of dissolved oxygen to go through nitrification and eventually denitrification and conversion to nitrogen gas that can be released to the atmosphere. The total requirement of the lower zone 22 materials would thus be about 480 pounds of dissolved oxygen to aerobically treat the biochemical oxygen demand and liquid ammonium ions (i.e., 220 times 1.5 plus 30 times 5). However, the top block of water in zone 20, even at full saturation, typically holds only about 8 pounds per million of dissolved oxygen. So to mix the bottom water with the top and keep all of the dissolved oxygen needs satisfied, a desired mixing fraction is about 60 parts of top water with every 1 part of bottom water. A 60:1 ratio would then be an anticipated setting for such a pond in order not to deplete the dissolved oxygen content of the upper zone 20. On a volume comparison, approximately 160 gallons per minute would be brought up from the lower zone 22 to be mixed with the water of the upper zone circulating at about 10,000 gallons per minute.

It is noted that the various valving and other arrangements for adjusting the size of the volume 52 being drawn up the draft tube 5' could be automated if desired. As for example, a probe or sensor 16 (see FIG. 15) could be provided to monitor the amount of dissolved oxygen in the zone 20. The electronic actuator 54' for the valve 54 in FIG. 18 could then be connected by line 18 to the sensor 16. In operation, the actuator 54' would be automatically activated in response to readings from the sensor 16 to selectively move the valve 54 to adjust the size of the volume 52. If the dissolved oxygen readings are relatively high, the volume 52 could be increased. Conversely, if the readings fall to levels threatening the vitality of the zone 20, the volume 52 can be decreased or even shut off completely. In this regard, all of the various arrangements for adjusting the size of the volume 52 could be so automated.

Referring again to FIG. 1 and in the environment of the first set of embodiments 1 in the ponds 4 with full pond circulation, it is normally desirable to limit the incoming flow to the tube inlet 7 in FIG. 1 to a substantially horizontal flow 66. Preferably, no water is drawn upwardly past the solid planar member 70 of FIG. 1. In this manner, many of the worst contents of the pond 4 (which typically settle to the pond bottom) are not disturbed and not drawn up and circulated to contaminate the rest of the pond 4. However, in some environments such as the tidal canal 4" of FIG. 24, it is desirable to be able to draw up some of the contents 68 below the plate member 70. More specifically and in a canal or similar body of water such as 4", the situation can develop that deadly sulfides from fish waste and other organic waste settle and collect in dangerous amounts at the bottom 26 of the canal 4". This is becoming very common in many canals that may be 100 feet wide with normal 6 foot deep sides but with a central, dredged depression 50 wide and 20 feet deep. Under most conditions during a year, the sulfides are confined and remain at the bottom 26. However, during certain times of the year (e.g., summer) and/or during certain catastrophic events (e.g., big storms or floods), the deadly sulfides can be displaced and/or mixed upwardly into the canal 4". The results can be devastating, including killing virtually all of the fish and other animal life in the canal 4". Such fish and other kills from contact with the deadly sulfides are infrequent events but can destroy the vitality of a canal or similar body of water 4" in simply a matter of days or even hours.

Consequently, in the environment of a body of water like the canal 4" in FIG. 24, it is desirable to continuously draw small volumes 68 of water from below the plate member 70 of the suspended inlet 7 of the depending tube 5 (see also FIG. 23). These sulfides normally build up in and above the layer 26 in FIG. 24 and below (e.g., 2 feet) the planar plate member 70. In operation and over the course of days or months, very small volumes of these deadly sulfides are slowly brought up toward the canal surface and dissipated throughout the canal 4". In such small volumes (e.g., 2%-10% of the total volume drawn up the tube 5 as for example 20-100 gallons per minute of a total draw of 3,000 gallons per minute) and concentrations (e.g., 110 parts per million), the sulfides can be processed and broken down (e.g., to sulfates) in the canal 4" without harming the fish and other wildlife.

When a catastrophic or other unusual condition in the canal 4" occurs, any sulfides at the canal bottom are still raised or stirred up into the main body of the canal 4". However, their volumes and concentrations are much smaller and less toxic due to the prior, cleansing operation of the system of FIGS. 23 and 24. Additionally, the volume and rate of sulfides and other materials being drawn up at 68 through the plate member 70 in FIGS. 23 and 24 are preferably adjustable (e.g., by the sliding valve member 72). In this manner, the operation of the system can be precisely adapted to particular environments and changes in the environments of the ponds or other bodies of water including 4". The valve member 72 in FIG. 23 can even be closed completely if desired or needed to strictly limit the entire flow coming into the tube inlet 7 to the horizontal direction 66 in FIGS. 1, 23, and 24.

Figure 23:
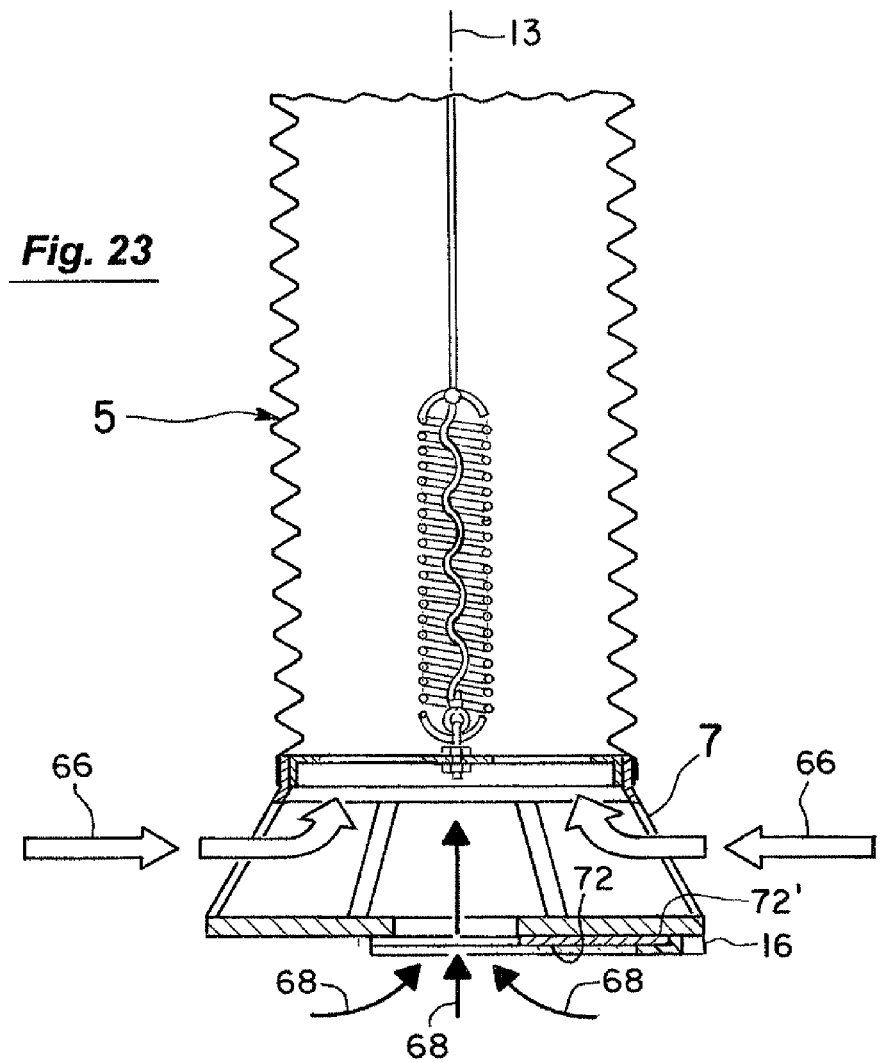
FIG. 23 is an enlarged view of the inlet portion of the draft tube of the embodiment of FIG. 1 modified to allow a controlled amount of water to be drawn up through the bottom plate member thereof.
Figure 24:
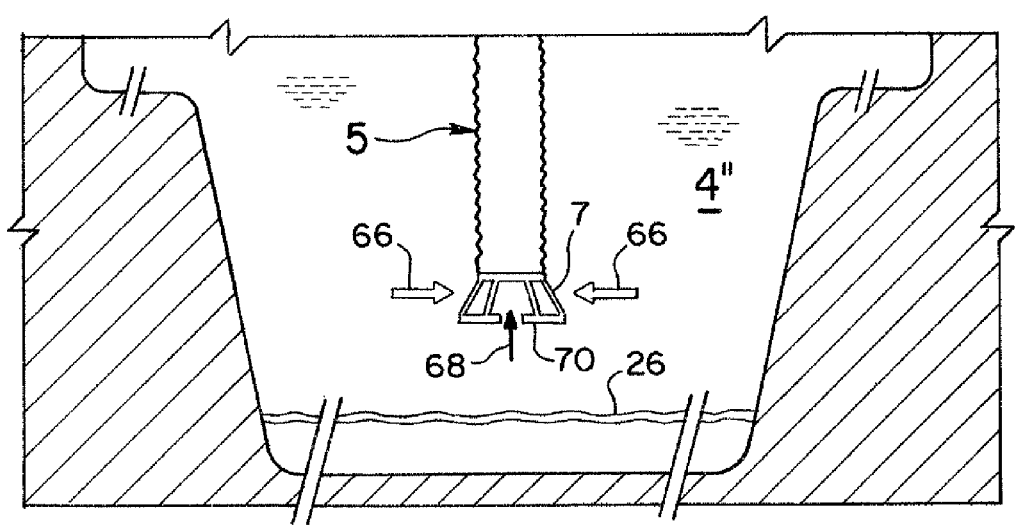
FIG. 24 show the use of the embodiment of FIG. 23 in the environment of a canal.

The plate member 70 in this regard extends substantially horizontally outwardly of the vertical axis 13 in FIG. 23. The plate member 70 is also spaced from and below the main body 34 of the draft tube 5 to create the substantially annular inlet opening therebetween for the incoming flow 66. Additionally, the operation of an electronic actuator 72' for valve 72 in FIG. 23 could be provided if desired to automatically adjust the size of the volume 68. Preferably, the sensor 16 would monitor hydrogen sulfide adjacent the plate member 70 but it could also monitor other conditions or be positioned as in FIG. 15 to read dissolved oxygen levels near the surface 6. If the valve 72 is not automated and the normal tides in the canal 4" or other body of water are fairly significant (e.g., 2 to three feet), the opening through the plate member 70 would either be sized or the valve 72 set to bring up a safe amount of sulfides in the volume 68 at low tide. At high tide with the plate member 70 two or three feet higher, the concentration of the sulfides in the volume 68 would normally be less but sulfides would still be brought up through the plate member 70 for treatment.

Figure 25:
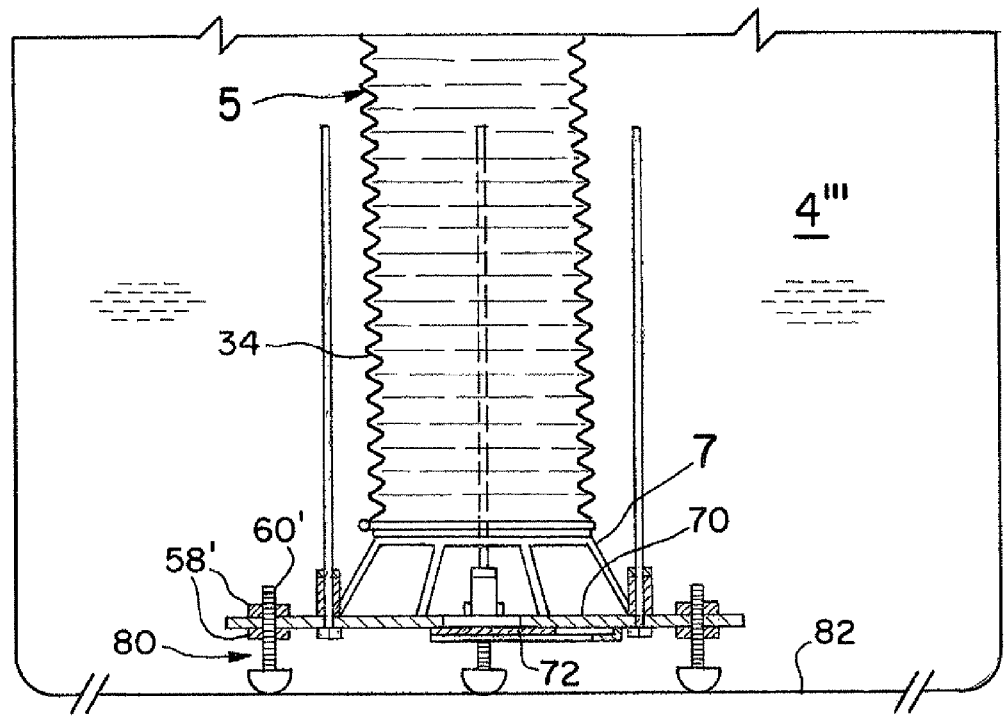
FIGS. 25 and 26 illustrate further modifications to the inlet portion of the embodiment of FIG. 1 adapting it to be supported on the bottom of a municipal water tank and provided with vertically extending arm members to collect and contain the collapsing draft tube as the water level in the tank drops.
Figure 26:
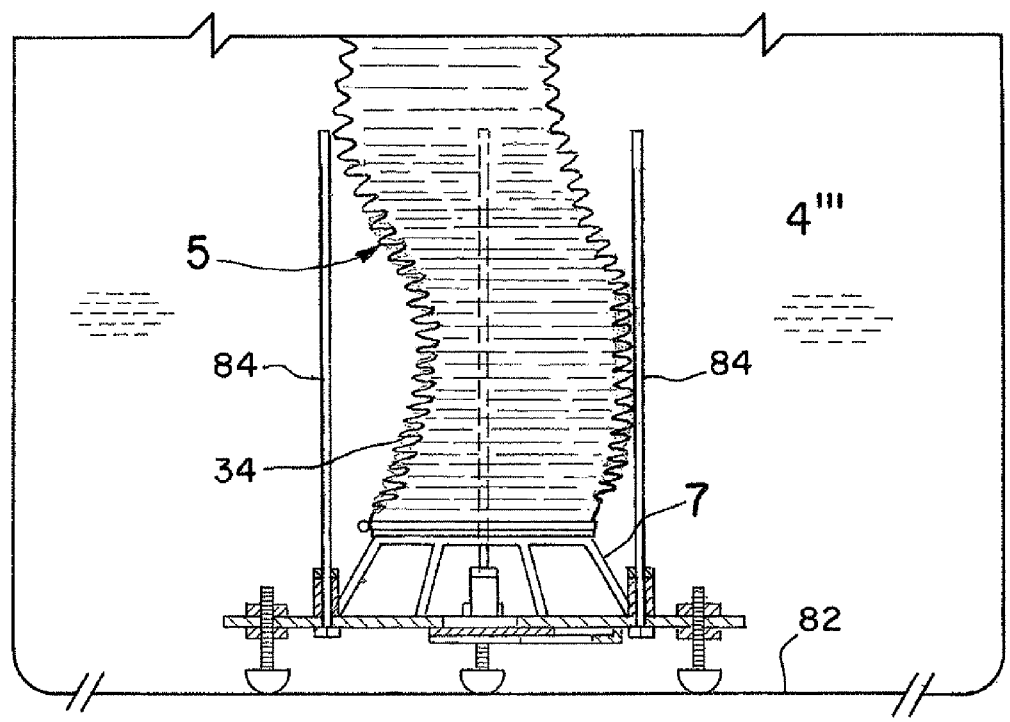

In FIGS. 25 and 26, the inlet 7 of the draft tube 5 has been modified for use in bodies of water such as municipal drinking or potable waster tanks 4'''. Such tanks commonly range from 100,000 to 150,000 gallons with depths from 30 feet when full to 4 feet or less during high or emergency use of the water. The water in the tanks like any other bodies of water can stratify due to temperature differences. Additionally, the water can age and become old in some parts of the tank leading to loss of chlorine concentration or residual. Further, if chloramine is used or applied instead of chlorine, nitrification can occur. Consequently, it is desirable to mix the entire body of water in the tank 4'''. In doing so, the inlet 7 of the draft tube 5 as shown in FIG. 25 has been modified to include an arrangement of legs 80 to support the plate member 70 at a predetermined distance just off (e.g., inches to 1 or 2 feet) the bottom 82 of the tank 4'''. Normally, this is just above any sediment in the tank 4''' so as not to unnecessarily disturb and draw it up. Although the plate member 70 can be valved as previously shown, the valve 72 is preferably closed so as to make the plate member 70 solid and not to bring up any flow from below the member 70. The lengths of the legs 80 are adjustable as by threaded bolts 58' and nuts 60'. Consequently, the distance the plate member 70 is positioned above the bottom 82 of the water can be adjusted as needed or desired. Each leg member 80 contacts the bottom 82 and is individually adjustable, which can be advantageous if the bottom 82 of the tank 4''' is sloped or otherwise irregular and not flat. The leg members 80 in FIG. 25 extend downwardly of the plate member 70 and are positioned outwardly (e.g., 1 to 2 feet) of the plate member 70 for stability.

As mentioned above, the depth of the water in tanks such as 4''' can vary widely (e.g., 30 to 4 feet or less) depending upon the municipal water demands. Correspondingly, the length of the collapsible tube 5 can change dramatically. In particular and at low levels of water, the bottom of the depending tube 5 may undesirably fold up and fall to one side or the other of the inlet portion 7 supported on the tank bottom 82. This can then adversely affect the overall operation of the system. To help prevent this, an arrangement of three or more arm members 84 is provided to collect and contain the collapsing tube 5 (see FIG. 26). The arm members 84 as illustrated extend vertically upwardly from adjacent the inlet portion 7 of the tube 5 and are preferably evenly spaced about the main body 34 of the tube 5. Consequently, as the main body 34 of the tube 5 collapses as the water level falls, the arm members 84 will capture or collect and contain the main body 34 of the tube 5 adjacent the inlet portion 7. The arm members 84 then keep the tube 5 from undesirably falling to one side or the other of the inlet portion 7 at the bottom 82 of the tank 4'''.

Figure 27:
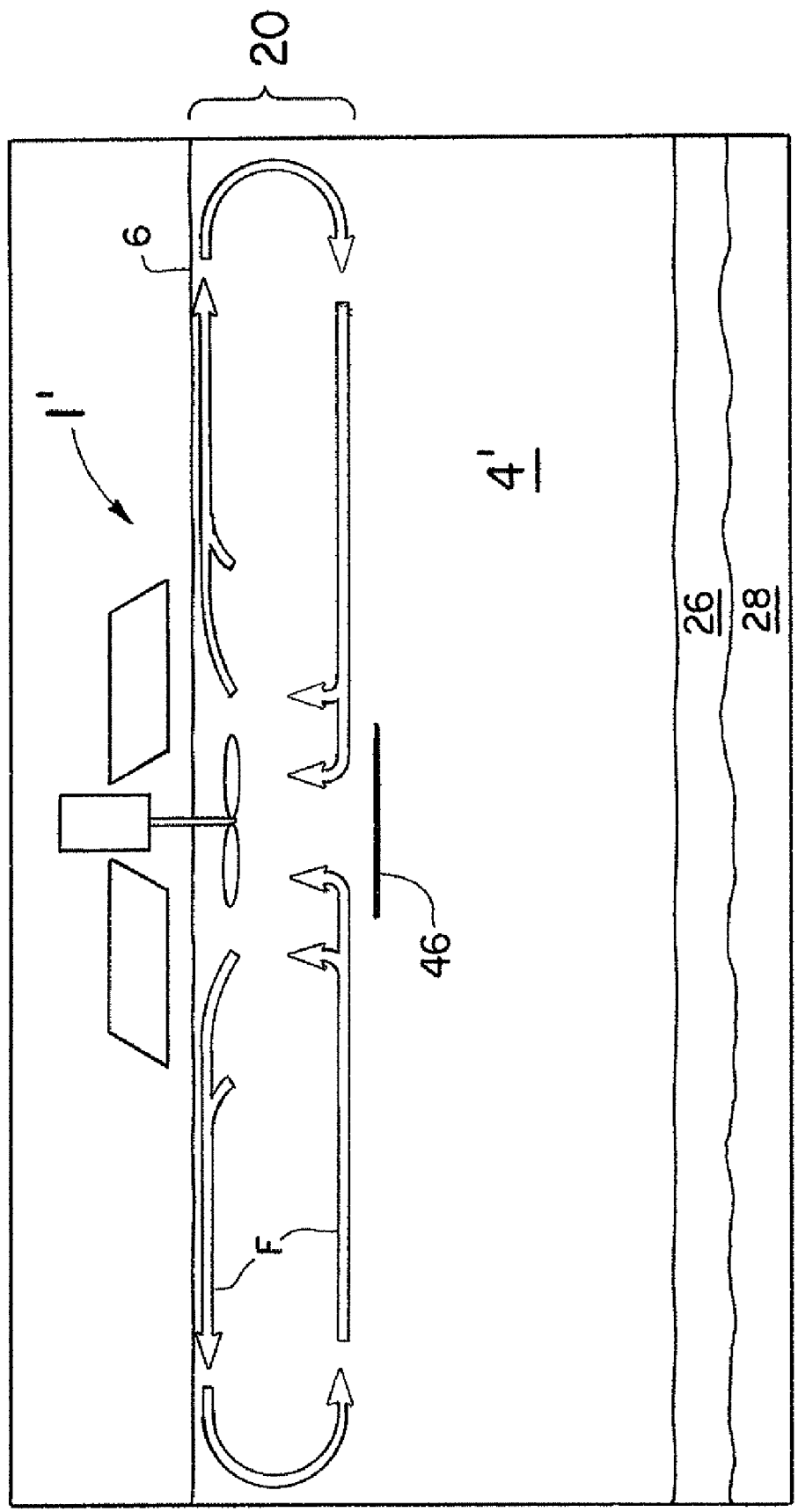
FIG. 27 schematically illustrates another embodiment of the present invention adapted for use to create an odor cap in a waste tank.

FIG. 27 illustrates an adaptation of the present invention to the specific environment in which the contents of the pond 4' or other body of water are intended to remain in place for a relatively long period of time. Such ponds 4' for example might be used to treat strong wastes from meat, vegetable, and paper processing plants as well as waste activated sludge from municipal mechanical wastewater treatment plants. In such ponds 4', it is desirable to let the waste settle to the bottom of the pond 4' to be anaerobically treated (or just stored) for days, months, or years. In such cases, odor control can be paramount as gases from sulfides and other materials bubble up to the surface 6 and escape into the atmosphere.

Figure 19:
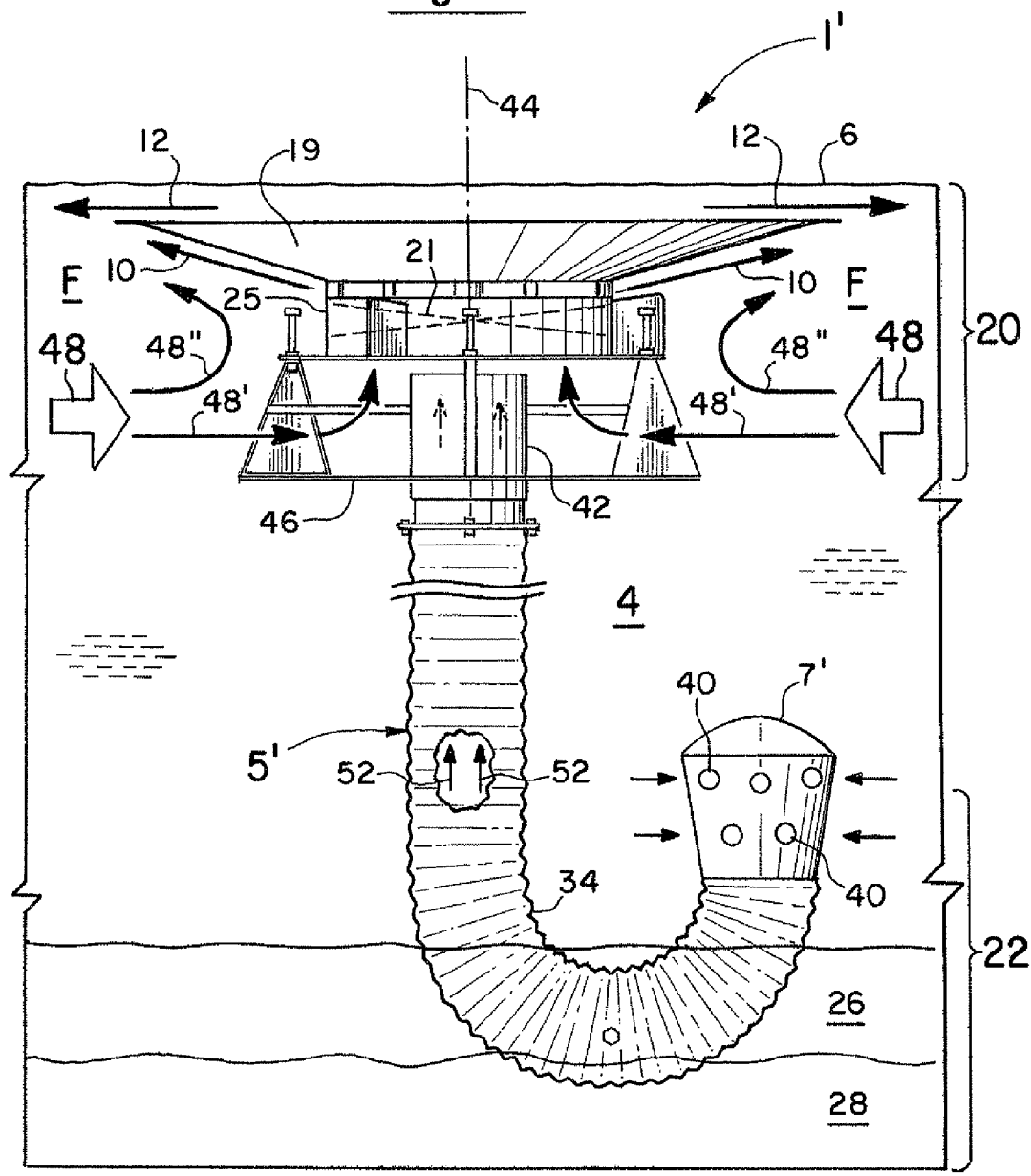
FIG. 19 is view similar to FIG. 15 illustrating the various flow paths created in the system.
Figure 20:
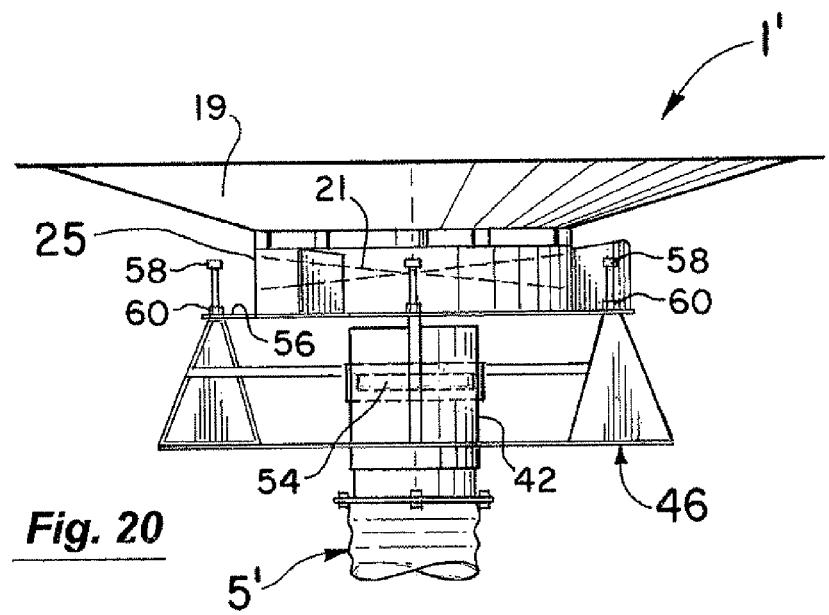
FIG. 20 is a side elevation view of the upper part of the system.
Figure 21:
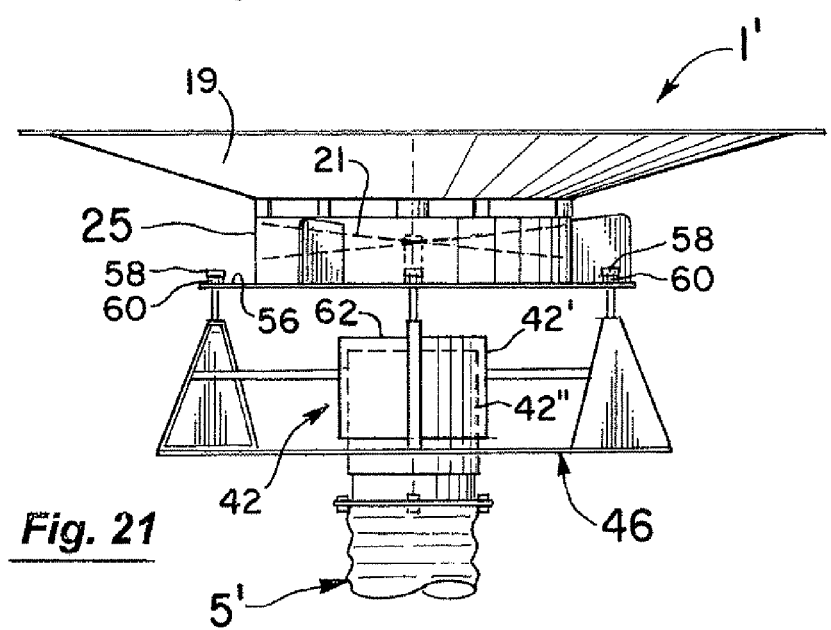
FIG. 21 illustrates the upper part of the system in an adjusted position.

In such environments, the basic circulating structure creating the aerobic zone 20 in the embodiments 1' (e.g., FIGS. 15-19) can be very effectively employed to create an odor cap for the pond 4' of FIG. 27. In particular and with the plate member 46 of the embodiments of FIGS. 15-19 closed or otherwise made into a solid piece and creating the circulating flow F as in FIG. 27, the contents of the pond 4' below the level of the plate member 46 will be essentially isolated and prevented from reaching the surface. Further, any gases bubbling up into the zone 20 from below the level of the plate member 46 will be effectively treated in the aerobic environment of zone 20 and harmlessly released into the atmosphere. Preferably, the operation of the dish 19 (see FIG. 19) would still be substantially the same in the environment of FIG. 27, whether or not the plate member 46 of FIG. 19 is solid or the flow through the draft tube 5' is simply closed to effectively make the member 46 a solid piece. The flow 48' from the depths (e.g., 1 to 2 feet) of the pond 4' passing through the housing 25 would then be proportioned as in the earlier embodiments 1 to flow along paths 10 and 12 in FIG. 19.

While several embodiments of the present invention have been shown and described in detail, it to be understood that various changes and modifications could be made without departing from the scope of the invention.

We claim:

1. A water circulation system for drawing water from the depths of a body of water to the surface for exposure to the atmosphere and creating a circulation pattern in the body of water, said system including a flotation platform, a dish supported slightly below said surface, a draft tube having upper and lower end portions wherein the draft tube is collapsible and the length thereof adjustable to vary the depth of the lower end portion of the draft tube in the water, and an impeller to draw water from the depths of said body of water up through said draft tube to the surface of the body of water wherein said system includes a spring positioned within said draft tube substantially closer to the lower end portion thereof than to the upper end portion thereof to absorb the force of surface waves raising the flotation platform.

2. The system of claim 1 wherein said system further includes a cable section to limit the expansion of the spring.

3. The system of claim 1 wherein said system further includes a cable section to prevent the expansion of the collapsible draft tube beyond a predetermined limit.

4. A water circulation system for drawing water from the depths of a body of water to the surface for exposure to the atmosphere and creating a circulation pattern in the body of water, said system including a flotation platform, a dish supported slightly below said surface, an impeller, and a draft tube having upper and lower end portions wherein the draft tube is collapsible and the length thereof adjustable to vary the depth of the lower end portion of the draft tube in the water wherein the collapsible draft tube is constructed to be substantially neutrally buoyant separate from the flotation platform, dish, and impeller.

5. The system of claim 1 wherein the spring is substantially at the lower end portion of said draft tube.

6. The system of claim 2 wherein the spring is a coil spring and said cable section extends downwardly within said coil spring.

\* \* \* \* \*